United States Patent [19]
Bohm et al.

[11] 3,765,230
[45] Oct. 16, 1973

[54] METHOD OF MEASURING INTRINSIC STRESSES IN STRUCTURAL COMPONENTS OF MACHINES AND APPARATUS AND DEVICES FOR PERFORMING SUCH METHOD

[75] Inventors: Wolfgang Bohm, Essen-Bredeney; Helmut Wolf, Duisburg-Grossenbaum, both of Germany

[73] Assignee: Kraftwerk Union Aktiengesellschaft, Mulheim (Ruhr), Germany

[22] Filed: Apr. 2, 1971

[21] Appl. No.: 130,724

[30] Foreign Application Priority Data
Apr. 4, 1970 Germany................... P 20 16 118.6

[52] U.S. Cl. .............................. 73/88 R, 73/88.5 R
[51] Int. Cl. ............................................... G01b 7/16
[58] Field of Search......................... 73/88, 88.5, 95

[56] References Cited
UNITED STATES PATENTS

| | | | |
|---|---|---|---|
| 3,068,688 | 12/1962 | Gunnert | 73/88 |
| 2,028,514 | 1/1936 | Mathar | 73/88 |
| 2,982,127 | 2/1961 | Scott | 73/88.5 |
| 3,071,963 | 1/1963 | Gunnert | 73/88 |

*Primary Examiner*—Herbert Goldstein
*Attorney*—Curt M. Avery, Arthur E. Wilfond, Herbert L. Lerner and Daniel J. Tick

[57] ABSTRACT

Intrinsic stresses are stresses within structural bodies which occur without the action of external forces or torques. Such stresses may impair the mechanical strength, dimensional accuracy and ability to properly function, and for that reason must be known in order to satisfy exacting demands, for example, those to be met by the rotors of turbines or generators. For determining intrinsic stress, a measuring area on the surface of the body is provided with strain gages such as bonded wire strips, which furnish an electric magnitude in response to deformation. Thereafter, a ring-shaped groove or slot is cut around the measuring area. The cutting, such as by means of a milling tool, has the effect of reducing the intrinsic stresses in the retaining core within the ring. The electrically measured changes in elongation are a measure of the intrinsic stresses in the undisturbed region of the material prior to the cutting operation. By a stepwise cutting operation of the groove, non-uniform distributions of intrinsic stress can also be ascertained along the depth of the body.

12 Claims, 22 Drawing Figures

Fig. 1
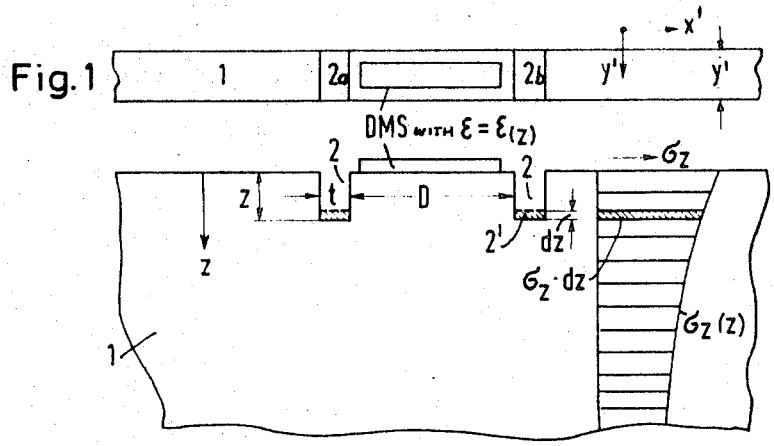
Fig. 1a
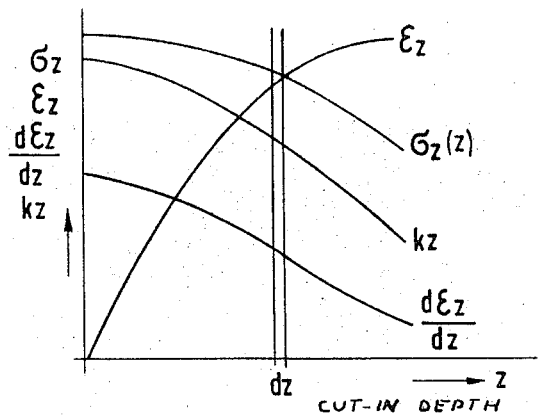
Fig. 1b
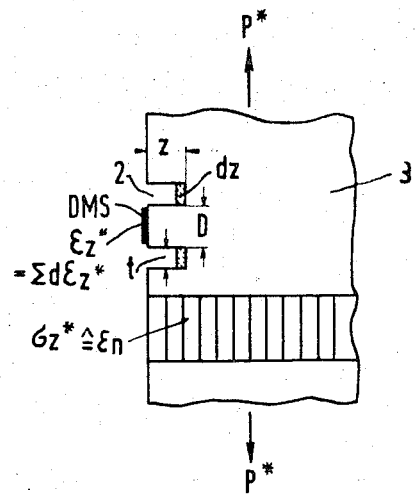
Fig. 1c

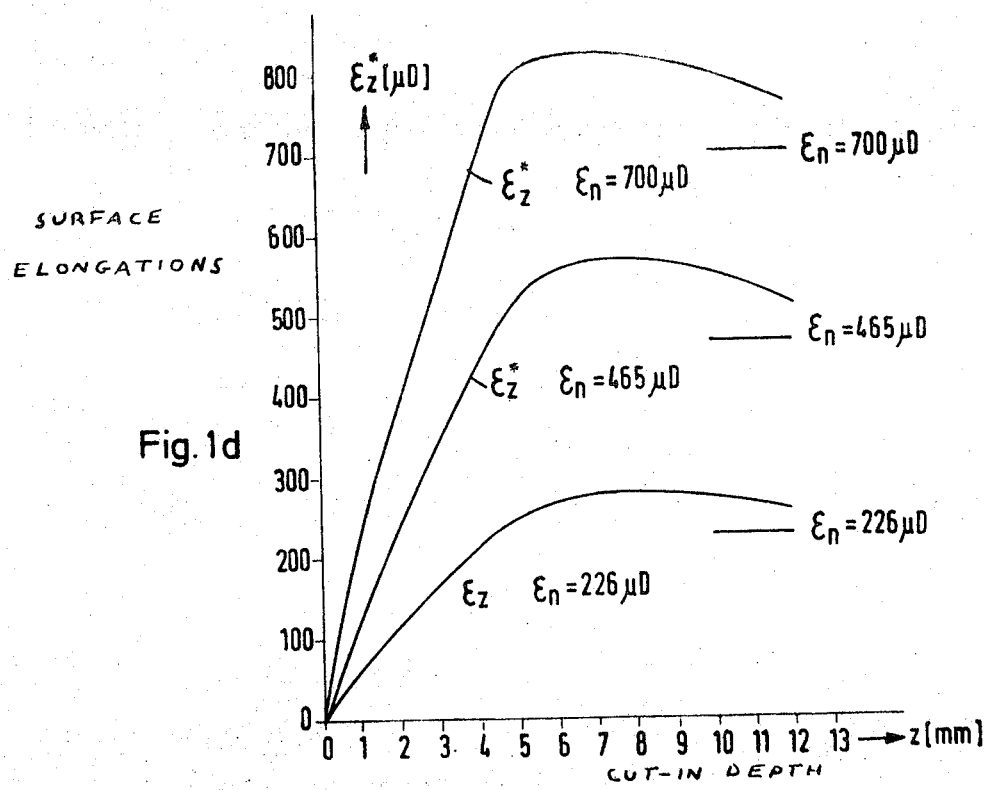
Fig. 1d — SURFACE ELONGATIONS
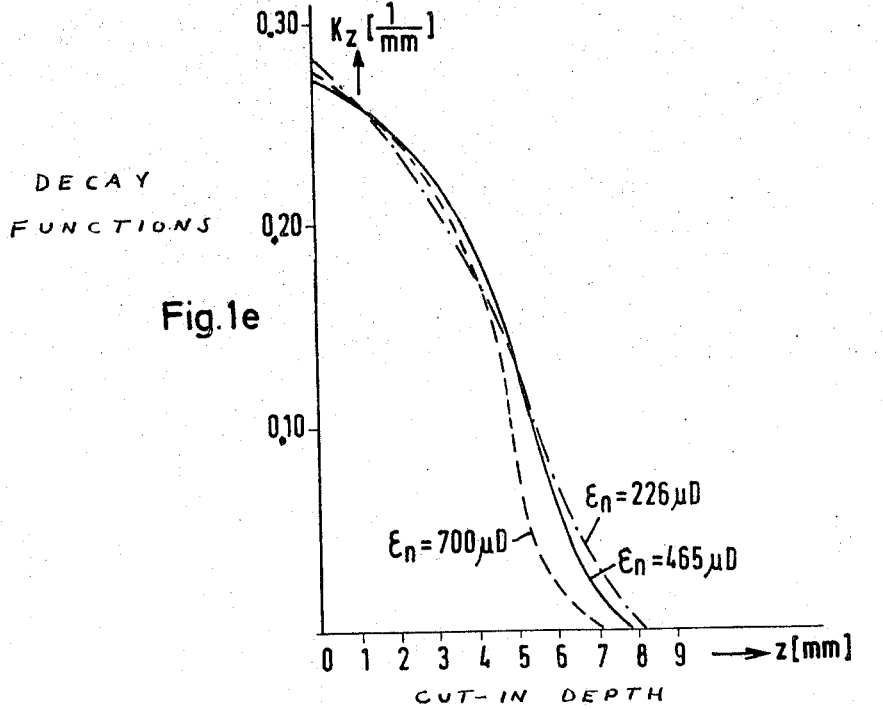
Fig. 1e — DECAY FUNCTIONS

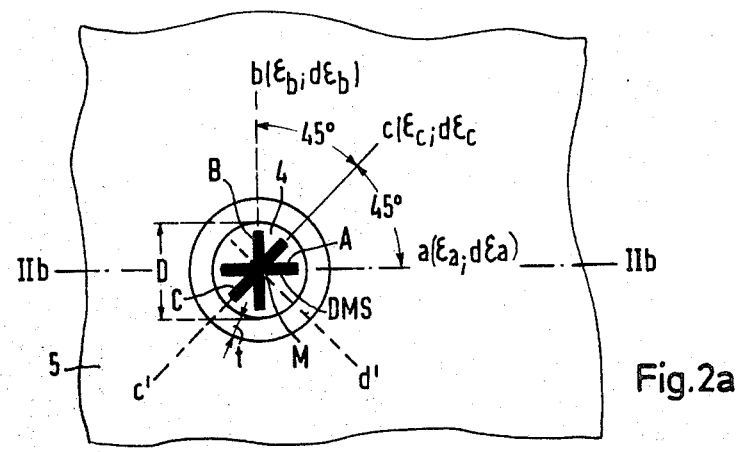
Fig. 2a
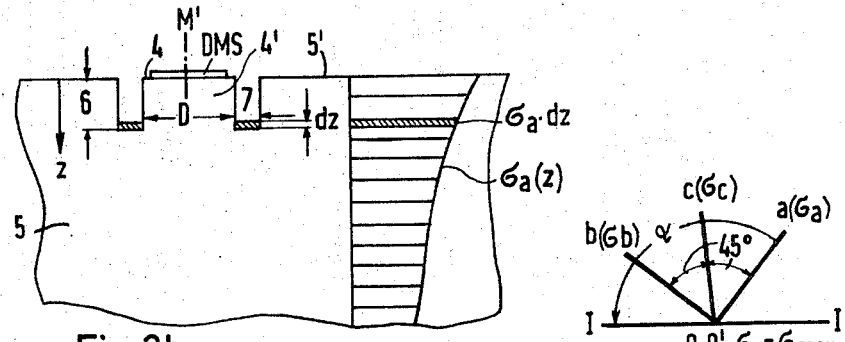
Fig. 2b
Fig. 2d
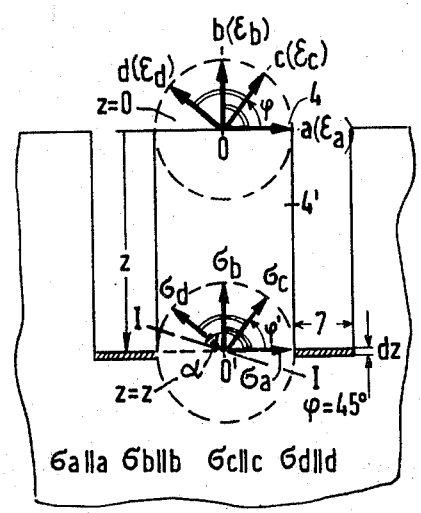
Fig. 2c
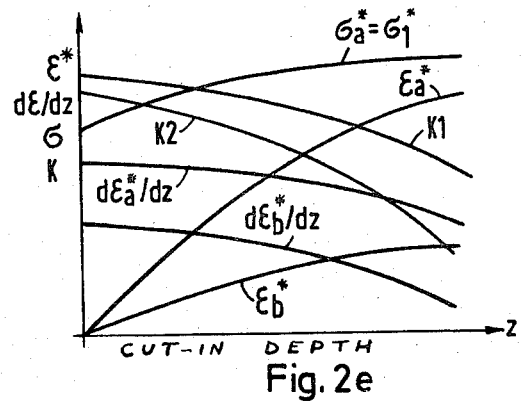
Fig. 2e

METHOD OF MEASURING INTRINSIC STRESSES IN STRUCTURAL COMPONENTS OF MACHINES AND APPARATUS AND DEVICES FOR PERFORMING SUCH METHOD

DESCRIPTION OF THE INVENTION

The invention relates to a method for measuring the intrinsic stresses in components used in the construction of machines and apparatuses such as rotors, discs, beams, housings and the like, and to a device for performing such method.

Intrinsic stresses are stresses within structural components which occur without the action of external forces and torques, whereby the internal forces and torques are balanced against each other. The primary causes of intrinsic stresses are:

1. Irregular, partly overelastic mechanical stress due, for example, to irregular stress distribution, pulling processes, etc.
2. Thermal sources in connection with plastic deformations such as thermal stresses or heat stresses due to impaired thermal expansions in temperature gradients or constriction stresses when constriction is impaired.
3. Occurrence or addition of surface layers.
4. Structural changes.

Intrinsic changes may affect the resistance, i.e. the stability, the accuracy of size and the functioning of a component and, therefore, the determination of intrinsic stresses is important. The determination of intrinsic stresses is effected in practice almost exclusively in an experimental manner, since theoretical predictions are possible only in very rare instances. We differentiate thereby between: non-destructive processes such as, for example, those using x-rays; partially destructive and partially non-destructive methods where the components being investigated are provided with bores and cuts; and completely non-destructive methods where a layer-wise machining of a representative component is undertaken. In partially or completely non-destructive methods, work is usually performed with strain gages or expansion measuring strips or strain setting meters.

Examining the measuring methods known to us at the present time with respect to their usefulness for measuring the intrinsic stresses of actual components such as, for example, rotors, discs, housings, jackets, casings or the like, we realize that only partly destructive and virtually non-destructive methods can be considered as far as accuracy and practical application are concerned, and that the virtually non-destructive methods are those in which there is no destruction of the actual component, but only cuts or incisions made in material additions. These known methods are limited, however, in their usage and measuring exactness.

According to the bore hole method of Mathar, described in the German Periodical "Messtechnische Briefe", of the firm Hottinger, Baldwin Messtechnik, March, 1968, pgs. 37 to 42, a hole is bored at the location of the component where the intrinsic stresses are to be determined. The diameter and bore depth of the hole depend on the thickness of the specimen. The boring releases a portion of the intrinsic stresses present in the material which causes measurable deformations to occur in the vicinity of the bore edge. By measuring the deformations within the region of the bore hole, the active intrinsic stresses can be determined. This method makes it possible to determine intrinsic stresses without having to completely destroy the specimen. The method had been developed for determining the two axial stress state which prevails at the surface of the workpiece, whereby expansions in three different directions must be determined. More particularly, three strain gauze strips or a collar with three grids are grouped around the bore hole.

The expansions which are measured in the region of the bore hole edge are almost analogous to the difference stresses which occur from the intrinsic stress state following the installation of the bore hole and from the intrinsic stress state, prior to the placement of the bore hole. The expansions measured in the region of the bore hole edge are relatively small, since they result from difference expansions. It is also characteristic of this method that only short lengths of the expansion measuring strips can be used, since the extensive analogy between the difference expansion nd the released intrinsic stress portions is present only in the immediate vicinity of the bore hole. The bore must therefore be relatively deep, since otherwise, the tension field of the non-bored workpiece layers may penetrate to the measuring place, so that the release of the intrinsic stresses would be insufficient.

On the other hand, it must be considered that in the immediate vicinity of the bore hole edge, large stress gradients and sometimes, plastic deformations, do occur. Therefore, a ring zone of expansion measuring elements must remain free around the bore hole. The maximum of the bore hole radius may amount to approximately 0.7 times the inner measuring circuit radius of the strain gages or expansion measuring strips.

It is further known to determine the intrinsic stress course along the specimen thickness by using the described bore hole method, which is the method of Vancrombrugge and Kelsey. Compare the aforementioned publication, pages 40, 41. In such method, boring is effected essentially layerwise, nd the elongation, expansion or stress changes in the vicinity of the bore hole edge, at each depth increase by the amount $\Delta_z$. From the changes in expansion or elongation, we may derive the average or mean released intrinsic stress of the bored-out small disc amounting to $\Delta_{zi}$ at the location Zi according to the equation $$\Delta\epsilon_o (Z_i) = k (\sigma_{zi})/(E)$$

wherein $k$ is a mathematical function which depends on the bore depth, the bore hole diameter and the geometrical arrangement of the strain gage or expansion measuring element. According to Kelsey, the expanded bore hole method also serves for determining the biaxial intrinsic stress state which prevails in each layer, whereby the elongations $\epsilon_x$, $\epsilon_y$, the intrinsic stresses $\sigma_x$, $\sigma_y$, and the conversion functions $k1$ and $k2$ are determined for arbitrary, mutually perpendicular directions. The previously mentioned disadvantages the bore hole method of Mathar are also disadvantages of the expanded bore hole method of Vancrombrugge and Kelsey.

It is also known in partially destructive methods to effect a complete release of the intrinsic stresses by cutting out a component part of the specimen. The cut-out piece then assumes a stress-free condition, so that the deformation which corresponds to the intrinsic stress condition is completely measurable. It has been suggested that circular pieces be milled out of the plate-shaped workpiece and that a three part collar be cemented onto the locality to be cut-out. The differentiation of normal stresses and bending stress may be effected with one collar each, on the top and on the bottom of the specimen. The disadvantage is that the method may be used only for relatively flat, plate-shaped components, that the milled-out hole is larger in diameter than in the bore hole method of Mathar.

To avoid such difficulties, suggestions have been made to provide the components being investigated ahead of time with appropriate material additions. That is, when casting integrally, and in order to release the intrinsic stresses prevailing in these formed pieces, extensions, additions and the like, these additions are separated from the remaining structure. This is the so-called cam process of Buhler and collaborators, described in the periodical "Giesserei, Technisch Wissenschaftliche Beihefte", 1966, Issue 3, pgs. 179 to 187. According to this method, the material additions to be removed, severed, or separated consist of cams or projections and the intrinsic stress state which continues in the cam is reduced by releasing the cam.

The changes in form of the cam are utilized for determining the edge intrinsic stress of the workpiece and are measured with the aid of strain gages or expansion measuring strips. This method works without destruction relative to the workpiece and thus represents specific progress compared to the bore hole method of Mathar. Its accuracy and practical application are limited, however. Furthermore, the additional material supply, that is, a material supply in addition beyond the surface layers of an original workpiece, in the form of cams or projections, constitutes an additional construction and production expenditure, particularly since sometimes an entire ring collar is needed wherefrom only a small cam piece need be separated by sawing.

During further processing, the cam or collar must be removed by machining, for example, rotation bodies, by being turned off before the actual turning is effected according to the size of the component. Finally, the deforming phenomena during the tempering and cooling processes in the projecting cam which has more working surface per volume than the actual component, may deviate from the deforming phenomenon of the actual component, so that sometimes the analogy between the intrinsic stress condition in the cam and the actual component may be impaired.

The object of the invention is to provide a virtually destruction-free method for measuring intrinsic stresses, which is more exact and simpler in usage than the cam method or the bore hole method.

The advantages attainable by the method of the invention lie primarily in the fact that any surface intrinsic stresses of the component to be investigated may be determined with considerable accuracy in a rapid and simple manner. No previous planning or preliminary work is needed on the component being investigated. Material approximately 1 to 3 mm in depth having a distance or diameter of about 25 mm need only be available at the locality being investigated.

The mew method does not require additional or separate material in the form of cams, projections or collars, or the like, as does the cam method. The exactness is far better than in the bore hole method and the necessity of cutting disc pieces out of the workpiece surface is eliminated. The method of the invention is a substantially non-destructive method for releasing intrinsic tensions and is effective with depths of about 1 to 3 mm. Such depths are usually present in most components as surface material additions in a crude condition.

The object of the invention is a method for measuring the intrinsic stresses in components used in machine and apparatus construction, such as rotors, discs, beams, housings, or the like, where the narrowly edged, limited or bordered surface regions of the component are provided with recesses, bores, holes, or the like, of limited depth. Therefore, the material layers which are adjacent the recesses and are provided with strain gages or expansion measuring members, undergo an expansion or elongation analogous to the intrinsic stress components which were present prior to the installation of recesses and were released by such recesses, bores, holes, or the like. The respective cutting depth of the recesses and the correlated expansions of the surface layers are measured, and the decay function depending on the depths of the bores, holes, recesses, or the like, which are provided at a given measuring spot or point geometry, and the cross-section of the recess, the measuring element utilized and the measuring element arrangement are determined. The intrinsic stresses which are analogous to the measure expansions or elonga-tions may be derived with the aid of the decay functions.

More specifically, in accordance with the invention, material layers of depth dz are removed around a measuring point provided with strain gages. The appertaining surface expansion $$d z = f(k_z, (1)/(E), \sigma_z, dz)$$

$$\epsilon_z = \sum_{z=0}^{z} d\epsilon_z$$

of the stationary core and the layer depth dz of the respectively removed material layers or the resulting groove depth $z = \Sigma\, dz$, are measured for each removed layer. This is done after a calibration test on a calibration material specimen, using the same measuring spot or point geometry determines the decay function $$k_z = f(E^*, (1)/(\sigma_z^*), (d\,\epsilon_z^*)/(dz))$$

by means of a layer-wise removal and measuring of the surface expansion or elongation $d\,\epsilon_{z=}$ or $$\epsilon_{z^*} = \sum_{z=0}^{z} d\epsilon_{z^*}$$

of the core and of the appertaining layer depths dz or groove depths $$Z = \Sigma\, dz$$

and from the determined magnitudes $d\epsilon_z$, $dz$, $k_z$ the magnitude $\sigma_z(z) = f(E, (1)/(k_z), (d\epsilon_z)/(dz))$ wherein $\sigma_z$ is the median intrinsic stress of the respective layer $dz$ released at the groove depth $z$ of the component; $\sigma_{z=}$ is the median intrinsic stress of the respective calibration material layer of the depth $dz$ simulated through outside forces, $E^*$ is the E modulus of the calibrating work material and $\sigma_z(z)$ is the intrinsic stress prevailing at any locality along the depth coordinate z of the component.

The method is applicable for planar surfaces as well as for curved surfaces, while for diameters of rotor bodies which exceed about 1000 mm, substantially no correction of the measuring result is necessary. Through stepwise milling, the method makes it also possible to determine irregular intrinsic stress distributions across a specific depth of the component. The method applies to known and unknown main tension directions.

A preferred embodiment of the method provides, since the prevailing intrinsic stress conditions are mostly multiaxial, that, during the original measuring and during the calibration test, the strain gages be arranged on a circular measuring spot and that circular, ring-shaped or annular layers of material be removed around the measuring spot. The surface expansion of the remaining core and the appertaining annular groove depths are measured. The annular core constitutes a favorable space form for the measuring spot arrangement and the annular groove is easy to machine.

A particularly preferred feature of the invention is the use of intrinsic stress measurements in components in biaxial intrinsic stress condition or such triaxial intrinsic stress conditions where a main stress is located in the vicinity of the free or exposed surface in first approximation, perpendicular to the surface and wherein planes parallel to the surface there prevails a virtually biaxial intrinsic stress condition, almost unaffected by the third main stress, with arbitrary directions (usually unknown) of the first and second main stresses.

To determine the individual main stresses and main stress directions, in accordance with the invention, the surface stresses $d\epsilon_a$, $d\epsilon_b$, $d\epsilon_c$ or $\epsilon_a$, $\epsilon_b$, $\epsilon_c$ of the annular core within the framework of the original measurement in three different directions, two of which are mutually perpendicular. These surface tensions occur in these measuring directions. Furthermore, the appertaining layer depth $dz$ or the annular groove depths $z = \Sigma \, dz$ are measured. This is done after a calibration test by using the same measuring spot geometry as in the original, with predetermined measuring directions at the calibrating material test in a simulated biaxial stress condition. The direction of the measured stress $\sigma_{a=}$ coincides with the direction of the outwardly applied main stress $\sigma_{1=}$ through measuring the surface tension $d\epsilon_{a=}$ of the measuring direction $a$ or $d\epsilon_{b=}$ of the measuring direction $b$ or $\epsilon_{a=} = \Sigma \, d\epsilon_{a=}$ or $\epsilon_{b=}$ of the annular core and the appertaining layer depths $dz^*$ or annular groove depths $z = \Sigma \, dz$. The decay functions are thus determined.

$$k_1 = f_1(z) = [(E^*)/(\sigma_{a=}{}^2 - \sigma_{b=}{}^2)](\sigma_{a=}[(d\epsilon_{a=})/(dz)] - \sigma_{b=}[(d\epsilon_{b=})/(dz)])$$

$$k_2 = f_2(z) = [E^*/\mu^*(\sigma_{b=}{}^2 - \sigma_{a=}{}^2)](\sigma_{a=}[d\epsilon_{b=}/dz] - \sigma_{b=}[d\epsilon_{a=}/dz])$$

From the thus determined magnitudes $d\epsilon_c$, $d\epsilon_a$, $d\epsilon_b$, $dz$, $k_1$, $k_2$ $$\sigma_a(z) = [E/(K_1{}^2 - \mu^2 K_2{}^2)](K_1[d\epsilon_a/dz] + \mu K_2[d\epsilon_b/dz])$$

$$\sigma_b(z) = [E/(K_1{}^2 - \mu^2 K_2{}^2)](K_1[d\epsilon_b/dz] + \mu K_2[d\epsilon_a/dz])$$

$$\sigma_c(z) = [E/(K_1{}^2 - \mu^2 K_2{}^2)][K_1(d\epsilon_c)/(dz) + \mu K_2([d\epsilon_a/dz] + [d\epsilon_b/dz] - [d\epsilon_c/dz])]$$

wherein $\sigma_a$, $\sigma_b$, $\sigma_c$ are the median intrinsic stresses released by the depth $z$ of the annular groove of the component of the respective surface of depth $dz$ in the predetermined three directions $a$, $b$ and $c$. $\sigma_a^*$ and $\sigma_b^*$ are the intrinsic stresses of the respective calibration material layer of depth $dz$. The tensions are simulated by outside forces. $\sigma_a(z)$, $\sigma_b(z)$ and $\sigma_c(z)$ are the intrinsic stresses in predetermined directions $a$, $b$ and $c$, respectively, which prevail at any arbitrary spot within the depth $z$ of the component. $\mu^*$ is the transverse contraction number of the calibration material. $\mu$ is the transverse contraction number of the component material.

In order to further simplify the determination of the intrinsic stresses, it is preferred to place the measuring direction $c$ between the measuring directions $a$ and $b$, so that its angle relative to the measuring direction $a$ is 45°, and the main intrinsic stresses result from $$\sigma_{1,2} = \sigma_{max,min} = \sigma_a(z) + \sigma_b(z)/2 \pm [1/\sqrt{2}] \sqrt{[\sigma_z(z) - \sigma_c(z)]^2 + [\sigma_c(z) - \sigma_b(z)]^2}$$

and the angle $\alpha$, measured counterclockwise from the measuring direction $a$ toward the main stress direction, results from $$\tan 2\alpha = (2\sigma_c(z) - [\sigma_a(z) + \sigma_b(z)])/[\sigma_a(z) - \sigma_b(z)]$$

According to another feature, the calibration test according to the method of the invention may be performed very simply by selecting for the calibration test, the second main stress $\sigma_{b=} = \sigma_2$ as zero, whereby the result is $$K_1 = f_1(z) = [E^*/\sigma_{a=}][d\epsilon_{a=}/dz] \text{ and}$$

$$K_2 = f_2(z) = [-E^*/\mu^*\sigma_{a=}][d\epsilon_{b=}/dz]$$

For a fundamental check of the method conducted with a simple planar calibration test, a calibration material is suitable, particularly a synthetic material which can also be used for photoelastic investigations such as, for example, epoxide resin, known under its tradename "Araldit B" with the E-modulus $$E^* \approx 3.0 \text{ times } 10^4 \text{ kp/cm}^2$$

and the transverse contraction number $\mu^* \approx 0.33$.

The use of synthetic material types as calibration material in the planar calibration test is essentially permissible, since the stress distribution and thereby the decay functions are independent of the work material. The use of synthetics as calibration material offers the following advantages. 1. The changes in the cut-in depth may be affected quickly and simply. 2. Adequately large elongation measurands or measured quantities may also be obtained with small outside loads, since the $E$-modulus is smaller by almost two powers of ten compared to the material of the structural components. 3. The loading is possible within a photoelastic apparatus. This affords control possibilities with respect to the load distribution and the symmetry of the stress distribution. The planar calibration test delivers only the decay function $K_1$ in planar form.

During the biaxial calibration test, the transverse con-traction number $\mu^*$ or the Poisson number $m^* = 1/\mu^*$ enters into the decay constant $K_2$ whereby usually $\mu^*$ in synthetics does not fully coincide with $\mu$ in steel. For this reason, and in order to eliminate possible error sources with respect to testing technique such as, for example, different heat transfer conditions in the original and the calibration material, the exact determination of the two decay functions $K_1 = f_1(z)$ and $K_2 = f_2(z)$ is effected with steel types or tie rods with the same transverse contraction number and with the same installation and testing technique as in the original, so that the accuracy may be at an optimum. Basically, synthetic material is also suitable for the biaxial calibration test when the indicated error sources are measured or determined.

Particularly suitable for the method of the invention are strain gage strips to be used as strain gages. The measuring spot geometry or configuration in accordance with the invention also makes it possible to arrange the strain gages or measuring elements in a particularly favorable way. The symmetry axes of the strain gage or measuring strips which have an approximately rectangular outline or cross-section in their outer contours run through the center point of the annular core. The greater part of the surface of the annular core is available for the application of the strain gage or measuring strips. The degree of release within the range of the usually provided cut-in cutting depths, is satisfactory at 1 to 3 mm and problems of limits for plastic deformations at the bore hole edge, as well as of the relatively narrow release zone around the bore hole edge, do not exist, as in the bore hole method.

A further object of the invention is to provide a particularly preferred device for performing the disclosed method, for a true-to-size machining or production of an annular groove or slot around a circular measuring spot. This device comprises a bearing block which may be mounted in the region of the measuring spot on the component being investigated and locked thereon, and a regulating or control housing, jacket, casing, or the like, which is positioned on the bearing block at a level which may be adjusted with respect to the measuring spot plane and when the bearing block is locked may be removed and reinserted, with respect to the bearing block.

The device further comprises a cutting head which is pivoted on the bearing surface of the regulating housing around a normal line which proceeds through the center of the annular core and is provided with a cutting tool arranged eccentrically to its axis of rotation in a manner whereby when the cutting head is rotated, the cutting tool describes the path of the annular slot, around the center of the measuring spot. The advantages of this simple device, which is disclosed in greater detail hereinafter, are as follows.

1. One may dispense with costly machine tools, thereby saving on a high hourly machine rate. 2. The device permits the production of grooves on round and planar bodies. 3. The device provides small cutting forces at a good removal of metal by the cutting tool, whereby only low temperatures occur during the processing, which widely helps to eliminate the occurrence of additional processing stresses or strain. 4. The device makes it possible to indicate the measuring spot and to apply the strain gage or measuring strips when the bearing block is affixed, clamped, stretched, or the like, so that an impeccable median position of the strain gage strips may be obtained.

A particularly preferred feature of the device lies in the fact that the bearing block basic body is a disc-shaped or plate-shaped body with a central thread bore for threading in a regulating casing having an appropriate outer thread and may be locked relative to the bearing block. The regulating housing is provided at its outer periphery with a scale division whose position with respect to a stationary marking of the bearing block is a measure of the level or height of the casing and the cutting head relative to the measuring spot and is therefore a measure for the cutting depth of the cutting tool. It is easily possible to arrange and develop the scales in such a way that a measuring and adjustment of the groove depth to 1/100 mm may be effected without additional measuring tools.

According to a preferred embodiment of the device, a spindle is pivotally mounted in an eccentric bore of the cutting head. The spindle is for the fastening of cutting tools such as, for example, of three knife hard metal milling tools, and for marking tools which may be coupled with the driving head of a hand bore machine which may be firmly clamped at the cutting head and preferably adjusted steplessly. In this manner, the device may be clamped to the component and, first of all, the measuring spot may be marked. Thereupon, the control or regulating casing may be removed with the cutting head, the strain gage strips may be installed on the circular measuring spot and, subsequently, when the hard metal milling tool is utilized, the control housing with the cutting head may again be inserted into the bearing block.

Thereafter, when the hand boring machine is turned on, a careful milling of the annular slot is effected by a slow manual feeding. When the respectively desired annular groove depth is machined in, the control jacket, housing, casing, or the like, with the cutting head may be unscrewed, without damaging the adjustment of the device. When the regulating housing is removed, the measuring conductors are connected to the connecting points or spots of the strain gage strips and the respective tension, expansion or elongation measurand is determined. After the measurement of the elongation or expansion, the measuring conductors, leads or lines are removed again, the regulating casing with the cutting head is inserted, and the next layer of the annular groove is removed.

The device may be designed and equipped for being affixed to components with cylindrical surfaces as well as for being affixed to components with planar surfaces, or to relative-ly narrow discs, as hereinafter described in greater detail.

In order that the invention may be readily carried into effect, it will now be described with reference to the accompanying drawings, wherein:

FIGS. 1 and 1a illustrate the principle of the method of the invention with respect to the uniaxial intrinsic stress condition of a body or disc, illustrated in cross-section in FIG. 1 and in vertical projection in FIG. 1a, whose surface is provided at a measuring spot with a strain gage strip;

FIG. 1b is a graphical presentation showing various magnitudes derived for determining the intrinsic stresses in a component according to FIGS. 1 and 1a, the magnitudes being plotted relative to the $z$ coordinate or abscissa axis and including the measured surface elongation $\epsilon_z$, the decay function $K_z$, the derivative of the elongation or expansion $d\epsilon_z/dz$ and the intrinsic stress $\sigma_z(z)$ prevailing at an arbitrary spot along the depth coordinate $z$ of the disc;

FIG. 1c shows schematically in cross-section and in section, a calibrating specimen for a planar calibrating test with a groove, in a uniform stress field which determines the decay function $K_z$ for measuring according to FIGS. 1 and 1a;

FIG. 1d is a graphical presentation of the surface elongations $\epsilon_{z=}$ in the calibrating device of FIG. 1c, in dependence on the cut-in depth $z$, wherein three different $\epsilon_{z=}$ curves are illustrated in dependence on three different tensile stresses $\sigma_{z=}$ or on the tensile stresses $P^*$ applied to the calibrating specimen;

FIG. 1e is a graphical presentation of the progress of decay functions $K_z$ depending on the cut-in depth $z$, which is determined by conversion from FIG. 1d;

FIG. 2a illustrates the actual measuring principle of the annular core method in cross-section whereby a biaxial intrinsic stress state with arbitrary main stress directions is present in the component, shown in section, and the measuring spot is provided with an annular slot around a circular core with strain gage strips;

FIG. 2b is a sectional view, taken along the lines IIb—IIb of FIG. 2a;

FIG. 2c is a schematic diagram on an enlarged scale compared to FIG. 2b, showing the coordination of the directions and angles of the strain gage strips in the plane $z = 0$ relative to the intrinsic stresses prevailing in the plane $z = z$, for deriving the principal equations of the biaxial intrinsic stress condition;

FIG. 2d shows in a coordinate system the correlation of the measuring directions $a, b, c$ with the direction of the main stress $\sigma_1 = \sigma_{max}$, in accordance with the measuring spot geometry of FIG. 2a;

Figure 2G:
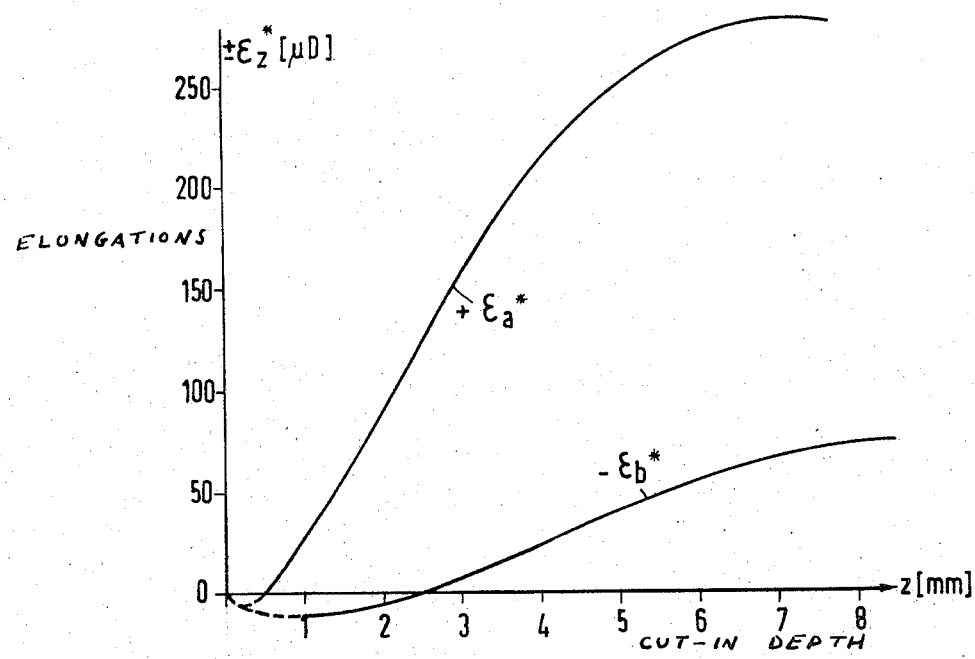
Figure 2H:
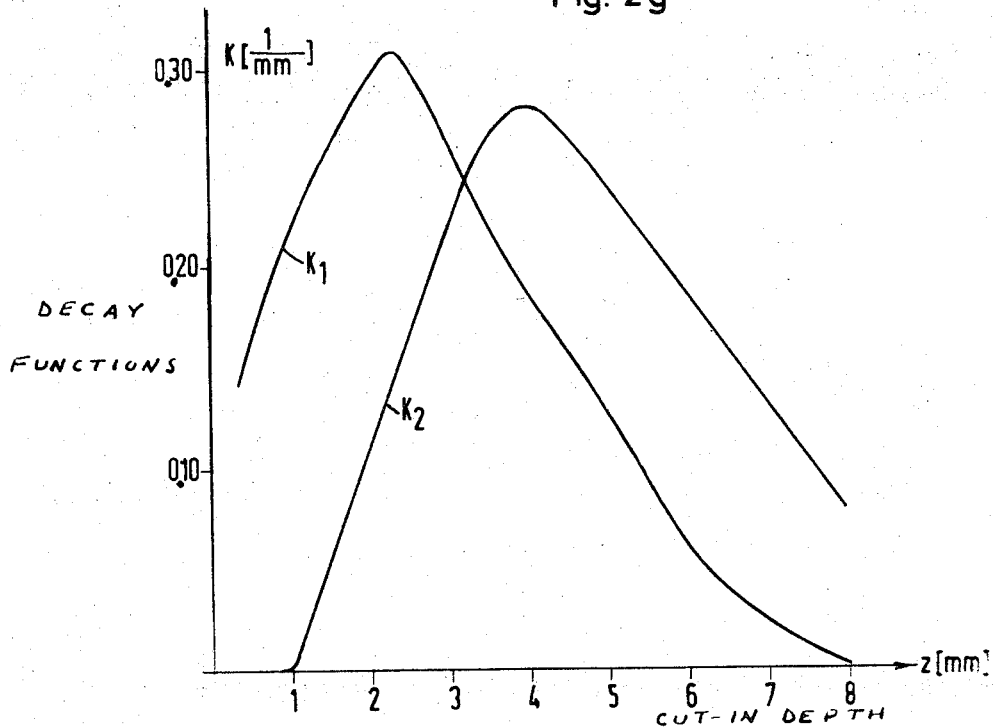
Figure 2F:
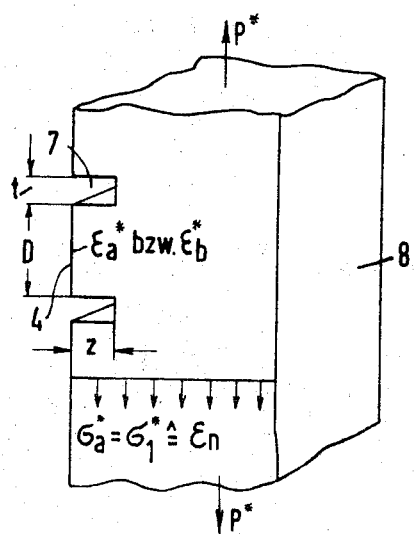
Figure 3A:
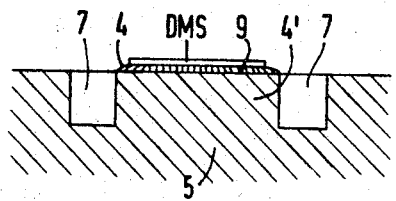
Figure 3B:
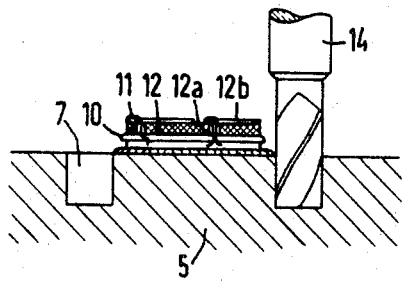
Figure 3C:
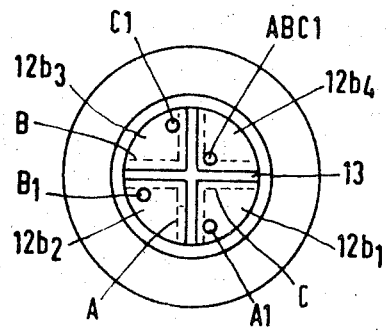
Figures 4B, 4D:
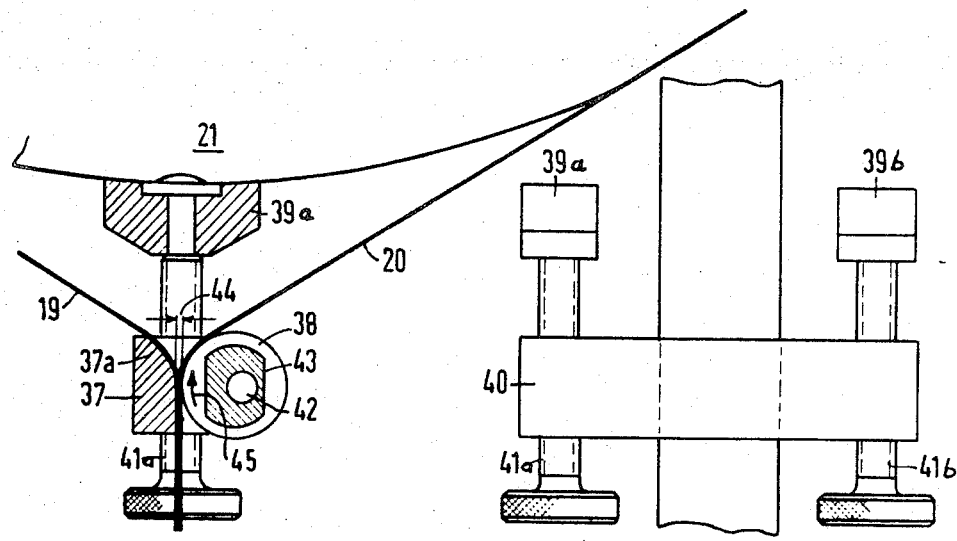
Figure 4A:
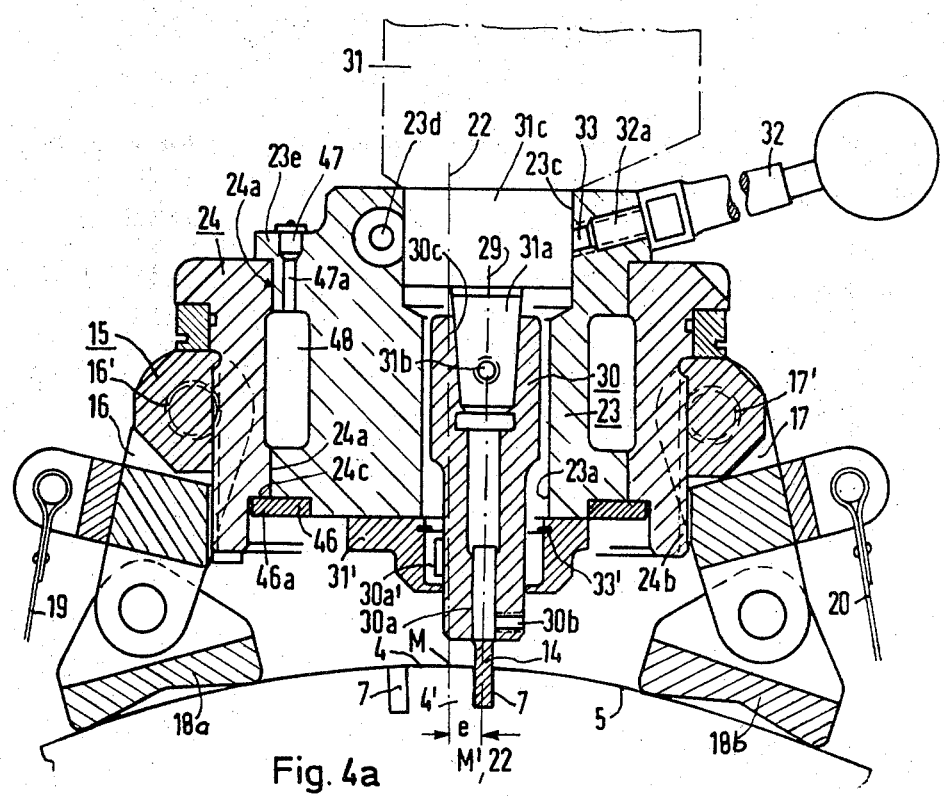
Figure 4C:
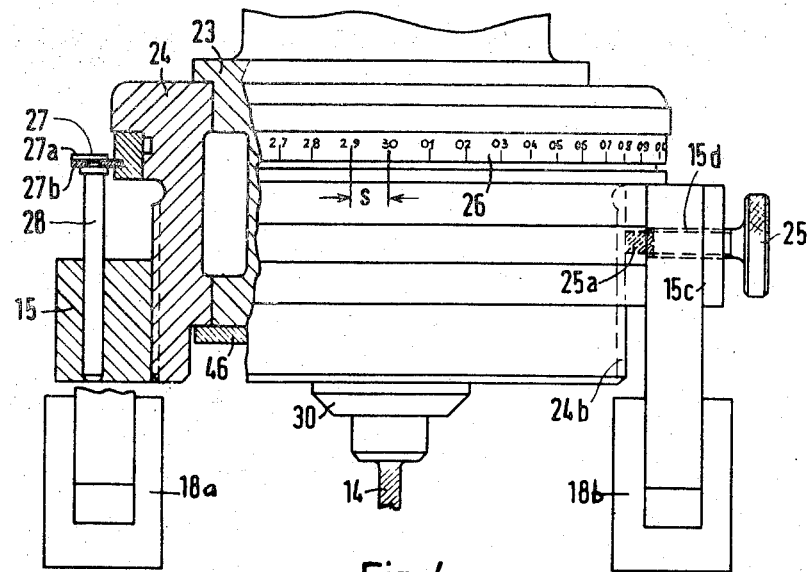
Figure 4E:
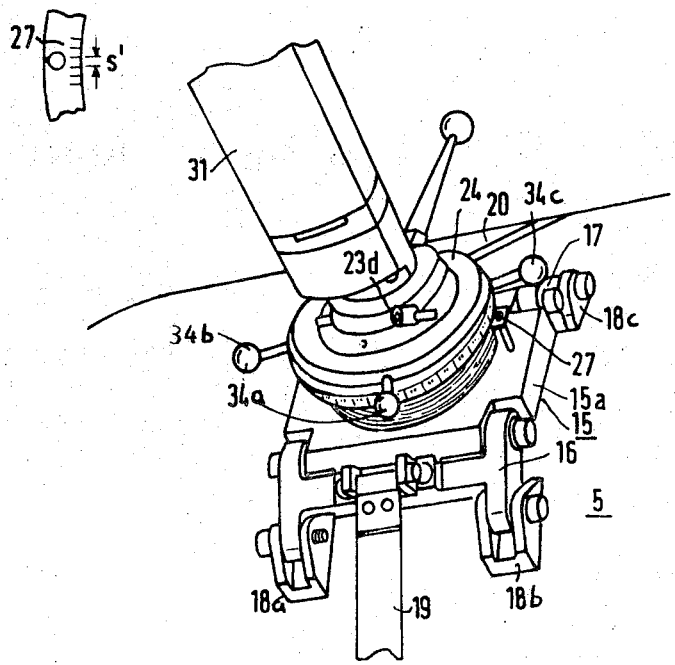
Figure 4F:
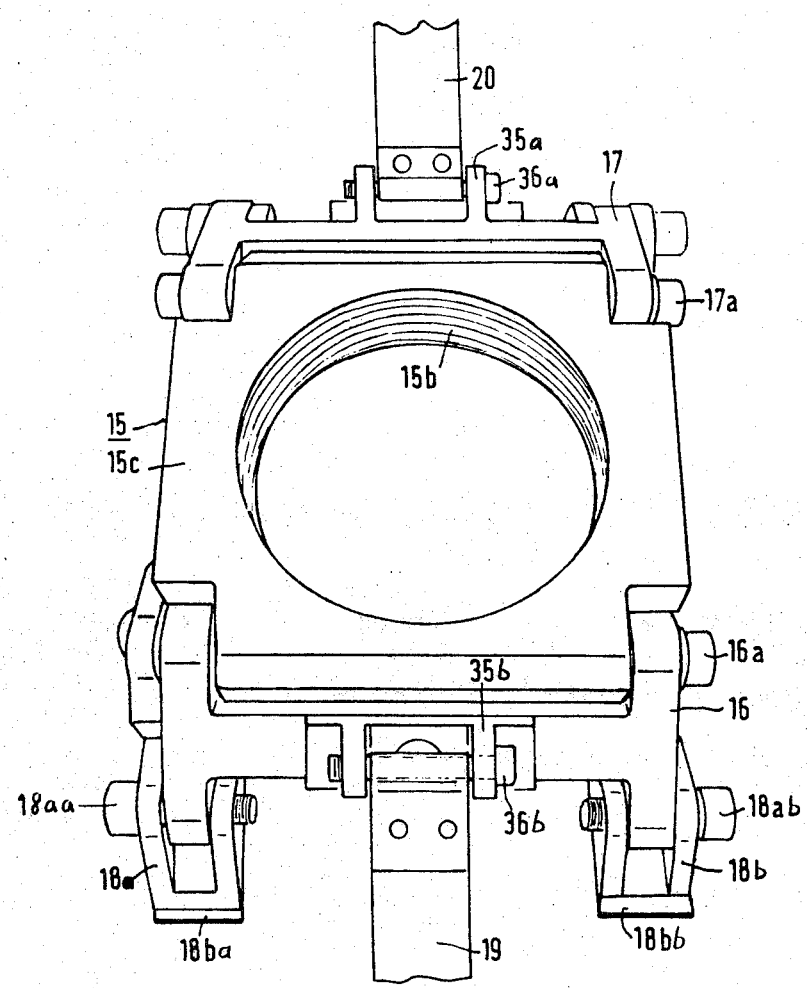

FIG. 2e is a graphical presentation in which, in connection with the calibration, magnitudes are plotted qualitative-ly relative to cut-in depth or the coordinate $z$, which magnitudes are of interest in determining the intrinsic stresses of a biaxial intrinsic stress condition, the magnitudes being the decay functions $K_1$, $K_2$, the main intrinsic stress simulated in the calibrating test $\sigma_{a=} = \sigma_{1=}$, the elongations measured in the calibrating test $\epsilon_{a=}$ and $\epsilon_{b=}$ and the derivatives of the last two magnitudes relative to $z$, which are d $\epsilon_{a=}/dz$ and d $\epsilon_{b=}/dz$;

FIG. 2f is a calibrating material specimen for a spatial calibrating test for determining the decay functions, the latter being required for evaluating a measurement executed with the measuring spot arrangement, according to FIG. 2a;

FIG. 2g is a graphical presentation wherein the longitudinal and transverse surface expansions $\epsilon_{a=}$ and $\epsilon_{b=}$ are plotted relative to the cut-in depth;

FIG. 2h is a graphical presentation wherein the decay functions $K_1$ and $K_2$ derived from FIG. 2g are plotted relative to the cut-in depth;

FIG. 3a shows in cross-section and in a preliminary condition the manner of applying the strain gage strips selected for a measuring spot arrangement according to FIG. 2a and with particularly favorable dimensions with the strain gage strip carrier being placed upon an adhesive layer;

FIG. 3b shows the cutting tool and the measuring spot arrangement according to FIG. 3a, wherein a protective layer and a solder support or bearing surface carrier thereon are placed on the strain gage strips;

FIG. 3c is a simplified illustration, in top view, of the measuring spot arrangement of FIG. 3b;

FIG. 4a is a schematic diagram, partly in section, of a preferred device for a true-to-size machining of an annular slot around a circular measuring spot, suitable for performing the method of the invention;

FIG. 4b is a schematic diagram of the clamping device which cooperates with the device of FIG. 4a;

FIG. 4c is a schematic diagram, partly in section, of a view of the device of FIG. 4a;

FIG. 4d is a lateral view of the clamping device of FIG. 4b;

FIG. 4e is a perspective view of the device of FIGS. 4a and 4c, including a hand boring machine affixed thereto and brought into position on the outer surface of original rotor components for turbogenerators; and FIG. 4f is a perspective view of the bearing block of the device of FIG. 4e on an enlarged scale when the regulating casing is removed, whereby the installed measuring device of the strain gage strips is shown.

DERIVATION OF THE FUNDAMENTAL EQUATION; UNIAXIAL INTRINSIC STRESS CONDITION

To explain the measuring principle and the theoretical basic factors, it is assumed that a uniaxial intrinsic stress condition prevails in a thin body 1, in FIGS. 1 and 1a. The illustrated intrinsic stress curve $\sigma_z(z)$ should be shown in the direction of the depth coordinate $z$, meaning that stresses, which are the main stresses, are present only perpendicularly to $z$. The body 1 is assumed to have width $y'$ which is very small relative to its longitudinal elongation or expansion $x'$ and its depth expansion $z$. When a strain gage strip DMS is mounted in the illustrated manner on the surface of the body 1, and one slot or groove 2a of width t and depth z is milled at a space D from another slot 2b, an expansion $\epsilon_z$ is measured by the strain gage strip DMS.

The elongation $\epsilon_z$ is, in the first place, a function of the magnitudes $z, D, \sigma_z$, the intrinsic stress in the disc 1, in the groove depth z and above the layer thickness $dz$, and E, which is the elasticity modulus of the component material. The following considerations may be made generally for balancing equations.

When the aforementioned median intrinsic tension $\sigma_z$ is present in the depth $z$ in a region $dz$ which has not been cut into as yet then, when this region dz is milled, a surface expansion $d\epsilon_z$ occurs in the DMS, whereby in the first approximation $d\epsilon_z$ is proportional to the product $\sigma_z(dz)$. Thus, considering Hooke's law $\epsilon = [\sigma/E]$, the following applies:

$$d\epsilon_z = K_z [1/E] \sigma_z dz \qquad (1)$$

For the factor $K_z$, subsequently designated as the decay function, the general rule applies that at a given measuring spot geometry, it depends on the depth z of the bore, hole, recess, or the like. The measuring spot geometry is characterized by the cross-section of the recess, bore, or the like, the strain gage elements utilized and the arrangement of the strain gage elements in the case on hand, through the magnitudes D and t and the type and arrangement of the strain gage strips. Therefore, $$K_z = f(z, D, t, \text{type and arrangement of DMS}) \qquad (2)$$

Hence, the decay function in the selected illustration is not a function of the intrinsic stress $\sigma_z$ and of the selected work material. At the same measuring spot geometry, the same $K_z$ curves apply in the calibrating and original test, with the correlations which can be recognized from FIG. 1b.

The decay function $K_z$ must be determined in the calibrating test, so that from Equation 1, at known values for $z$, $\epsilon_z$ or $d\epsilon_z$, $dz$ and E, the intrinsic stress $\sigma_z$ may be determined at a specific spot. If the magnitude of the intrinsic stress is to be determined only at one specific spot or point, it would actually suffice to determine the value of the function $K_z$ for this one cut-in depth and, accordingly, to measure in the original test only one magnitude z and the subordinate elongation $\epsilon_z$. In practice, it is desired, however, to determine the course of the surface intrinsic stresses within a certain depth, so that slots or grooves 2a and 2b shown in FIG. 1a, are enlarged, step by step, which is brought to attention by the illustrated material layer 2' having a thickness $dz$.

Thus, in the original test, slot or groove layers of thickness $dz$ are removed, stepwise, and after such removal the elongation $\epsilon_z$, the groove depth z and the depth of the just-removed layer $dz$ are measured. The calibrating test, according to FIGS. 1c and 1d, is effected, accordingly. FIG. 1c shows a slice, thin body or disc-shaped calibrating material specimen 3, which comprises a synthetic material suitable for photoelastic investigations, namely an epoxide resin with the E modulus $E^* \approx 3.0$ times $10^4$ kp/cm² and the transverse contraction number $\mu^* \approx 0.33$. Such a synthetic material is known by the tradename Araldit B.

The calibrating specimen 3, illustrated in section, is subjected to an outside loading stress by means of tension or pulling forces P* which leads to a uniform tensile strength $\sigma_{z=}$, which again produces an elongation $\epsilon_n$ which is uniform across the cross-section. The magnitude of the normal elongation or expansion $\epsilon_n$ of the appertaining outer loading stress $P^*$, was changed in order to establish whether the course of the decay function $K_z$ (see FIG. 1e) depends on the absolute magnitude of the normal elongation $\epsilon_n$. FIG. 1d explains three different, outer loads, expressed through their normal elongation $\epsilon_n = 226 \mu D$, $465 \mu D$ and $700 \mu D$.

The microelongation or microexpansion $\mu D$ is customary in photoelasticity. 1000 $\mu D$ corresponds to a tensile stress of 20 kp/mm² in steel and a tensile stress of 0.3 kp/mm² in a synthetic material with a uniaxial tension condition. The measuring spot geometry in a calibrating test is the same as in the original test indicated in FIG. 1a. Here, too, material layers of thickness $dz$ are gradually removed and the appertaining elongations or expansions are measured by the strain gage DMS. These elongations are denoted $\epsilon_{z=}$ in order to point out that these are elongations of the calibrating test. From Equation 1 we derive that following the effected calibrating test the decay function $K_z$ may be determined according to:

$$K_z = [E^*/\sigma_{z=}] [d \epsilon_{z=}/dz]$$

(2a)

Known in the calibrating test, and to be measured, are the magnitudes z, $E^*$, $\sigma_{z=}$ and $\epsilon_{z=}$ and the magnitude $d \epsilon_{z=}/dz$ is to be derived. The curve of the decay function $K_z$ may therefore be determined in dependence upon the cut-in depth z, according to FIGS. 1b and 1e. The decay function $K_z$ is independent of the material and of the stress condition during calibration. After the decay function has been determined, the intrinsic tension $\sigma_z(z)$ may be determined based on the original test, as pre-viously mentioned, according to an equation $$\sigma_z(z) = [E/K_z] [d\epsilon_z/dz]$$

(3)

In Equation 3, all the magnitudes on the right side are known or may be measured and derived. These magnitudes are z, E, $K_z$ and $\epsilon_z$. The factor $(d \epsilon_z)/(dz)$ may either be measured or derived from the curve $\epsilon_z = f(z)$. The above-indicated measured or derived magnitudes are qualitatively shown in FIG. 1b. According to FIGS. 1, 1a and 1b, the variable layer element $dz$ has the intrinsic stress $\sigma_z$ which is to be released and determined. In summary, the following steps are for determining the intrinsic stress distribution $\sigma_z(z)$, in the original material of the component investigated.

1. Determine $K_z = f(z)$ in a calibrating test, by using the same measuring spot geometry as in the original test.
2. Determine $\epsilon_z$ in the original as a function of the cut-in depth z, wherein $\epsilon_z$ according to FIG. 1b is a surface tension which constantly changes as the cut-in depth increases.
3. Form $[d \epsilon_z/dz]$, for example, graphically, at each spot of the function $\epsilon_z = f(z)$.
4. Calculate $\sigma_z(z)$ from the known $K_z$ and $[d \epsilon_z/dz]$ values.

DERIVATION OF FUNDAMENTAL EQUATIONS; BIAXIAL INTRINSIC STRESS CONDITION

The method disclosed in FIGS. 1, 1a and 1b for determining a uniaxial intrinsic stress condition makes it possible to recognize the basic principle of the invented method very clearly, but its importance is diminished compared to the method which determines a multiaxial intrinsic stress condition, since in most instances multiaxial intrinsic stress occurs in the actual components of the machine and apparatus structure such as rotors, discs, beams, housings, and the like. These components have, as a rule, a triaxial intrinsic stress condition, and it may be assumed that in the vicinity of the free surface, a main stress is present in first approximation, perpendicular to the surface. The planes parallel to the surface have a biaxial stress condition generally with arbitrary main stresses and main stress directions. To carry out a complete determination of such a biaxial stress, the measuring must be accomplished in two directions in known main stress directions, and in three directions in unknown main stress directions.

A preferred embodiment of the method of the invention suggests, therefore, that the procedure follow FIGS. 2a to 4f, hereinafter described. The strain gages or elongation measuring elements or components are generally denoted DMS and are positioned during the original measurement and during the calibration test on a circular measuring spot 4, of a spatial component 5 (FIGS. 2a and 2b). Annular layers of depth $dz$ are removed around the circular material, whereby the surface elongations or expansions of the remaining core 4' of the annulus and the appertaining depths z of the annulus slot or groove and the layer depths or thicknesses $dz$, are measured.

In FIGS. 2a and 2b, a component 5 is the original material or unfinished art of a turbogenerator rotor, whose cylindrical surface 5' contains the usual material additions of a thickness 6. An annular groove or slot 7 is formed in the depth of the additional material. The annular slot 7 is formed gradually around the annular core 4' by removing layer elements of the depth or thickness $dz$, after the strain gage DMS has been installed on the circular measuring spot 4.

As shown in FIG. 2a, three strain gage strips A, B and C intersect at the center M of the annular core 4' and the measuring spot 4. The appertaining longitudinal and symmetry axes a, b and c of the strain gage strips, which may have a rectangular cross-section in their outer outlines, run through the center point M of the annular core 4'. The longitudinal symmetry axes a, b and c are identical with the three selected measuring directions, which are necessary because, generally, the main stress directions are unknown. The measuring directions a and b are mutually perpendicular, and the measuring direction c is placed in the center between the measuring directions a and b and its angle is therefore approximately 45°, relative to measuring direction a or b.

The strain gage strips A, B and C form a DMS collar, which is illustrated in mirror-symmetry with respect to two symmetry axes c' and d' through the center point M of the annular core 4' (FIG. 2a). If, as shown in FIG. 2b, the annular groove 7 is deepened by the depth $dz$, an appropriate elongation change $d\epsilon_a$ is measured in the measuring direction a by the strain gage strip A, according to the intrinsic stresses $\sigma_a$, $\sigma_b$, $\sigma_c$ which are released in the depth z. The intrinsic stresses are assumed to be constant, throughout the depth $dz$.

As shown in FIG. 2b, a stepwise removal makes it possible to determine the course of the intrinsic stress $\sigma_a(z)$ via the depth z of the component, in the measuring direction a. Prior to this, however, appropriate measuring and computing operations must be carried out, taking into account the two-dimensional Hooke Law. That is, a two-dimensional calibrating test must be effected from the transverse stresses, as hereinafter explained. The same applied to the measuring directions b and c and their resultant elongations $\epsilon_b$ and $\epsilon_c$ and elongation changes $d\epsilon_b$ and $d\epsilon_c$ and their median intrinsic stresses $\sigma_b$ and $\sigma_c$, which are released at a specific depth z of the annular groove.

As previously mentioned, measurements must be effected during the calibrating test, for determining the decay functions $K_1$ and $K_2$ which apply for two mutually perpendicular directions. The following will disclose, first of all, the theoretical principles necessary for an understanding of the measurement and evaluation during the original test and the calibrating test.

In this respect, we first refer to FIG. 2c, where, in the interest of clarity, the annular slot or groove is depicted to have a depth z, deeper than normal, so that room is left for a coordinate system O in the plane $z = O$ and a coordinate system O' in the plane $z = z$, whereby these coordinate systems are tilted upward from the measuring plane 4, into the plane of the paper. The same components of FIGS. 2a, 2b and 2c are identified by the same reference numerals. The prerequisites for performing the annular core method via an annular slot 7 are as follows.

1. The z direction should be the main direction.
2. An arbitrary biaxial intrinsic stress condition should exist perpendicular to the coordinate z, whereby as a function of z the magnitude and the direction of the intrinsic stresses be variable. 3. The third main stress, parallel to the coordinate z, should be zero or its influence upon the stress condition in the planes perpendicular to the coordinate z should be negligible.

A connection is now sought between the elongations measured on the surface of the plane $z = O$ and the main stresses $\sigma_1 = \sigma_{max}$ and $\sigma_2 = \sigma_{min}$ in the plane $z = z$. In a known main stress direction, a measurement in two directions a and b would be sufficient. In unknown main stress directions, however, an additional measuring in direction c is also required for determining the angle $\alpha$ between the direction of the main tension $\sigma_1$ and a given reference direction at the surface. A consideration of Equation 1 provides the following correlations.

It is assumed that in depth z, in the region of a layer element of depth $dz$, a constant planar stress condition prevails in a plane perpendicular to the coordinate z with main stresses $\sigma_1 = \sigma_{max}$ and $\sigma_2 = \sigma_{min}$ and the angle $\alpha$ of the main direction I—I, relative to reference direction a (FIG. 2d). The normal stresses $\sigma_a$, $\sigma_b$ and $\sigma_c$, $\sigma_d$ may occur in the directions a, b, c and d. This localizing of the planar stress condition at the depth z to the origin of the coordinate system O' is advantageous and permissible. The stresses $\sigma_a$, $\sigma_b$ and $\sigma_c$, $\sigma_d$ define a rectangular system of coordinates or an intersection of axes, and both intersecting axes are twisted relative to one another, by the angle $\phi$. If the layer $dz$ having an annular width $t$ is removed at the depth z, a planar stress condition occurs in the plane $z = O$. In the illustrated case of rotation symmetry of the annular core, and assuming that the released stresses or the measured elongations remain within the elastic range, the following applies.

1. The elongation or expansion change $d\epsilon$ measured in the plane $z = O$ is a result of removing the stress volume $\sigma dz$, wherein $\sigma$ is the normal median stress, across the layer thickness $dz$.
2. The main directions of elongation in the plane $z = O$ are parallel to the directions of main stress in the plane $z = z$ through the origin O'.
3. Each stress component in any desired direction x, within the plane through O', $\sigma_x \, dz$, delivers a subordinated stress component $d\sigma_x$ in the direction x, within the plane through the origin O, and also delivers via the transverse elongation an elongation component $d\epsilon_y$ in the direction y, also in the plane through O. x is parallel to x and y is perpendicular to x.
4. For the correlation between the stress components and the elongation components, the basic Equation 1 always applies. For the transformation of the stress component $\sigma_x \, dz$ into the elongation component $d\epsilon_x$ which lies in the same direction, another decay function applies, which is $K_z = K_1$, than for the transformation of the stress component $\sigma_x \, dz$ into the elongation component $d\epsilon_y$ of a direction perpendicular thereto, which in this instance is $K_z = K_2$.
5. From the foregoing four points it is concluded, in connection with the two-dimensional Hooke's Law and the Mohr tension circuit, that the original direction with respect to the main tension directions may be arbitrary.

The correlations which exist for magnitudes $\sigma_a$, $\sigma_b$ and $d\epsilon_a$, $d\epsilon_b$, according to the variable two-dimensional Hooke's Law, also apply to the magnitudes of the system of coordinates c, d. The angle $\phi$ may be chosen as desired, but must be equal in the planes $z = O$ and $z = z$; that is $\phi = \phi 1$.

In accordance with the foregoing prerequisites, the following correlations are obtained. The elongations are due to $$\sigma a: (d\epsilon_a)_{\sigma_a} = K_1 [1/E] \sigma_a \, dz$$

(4)

$$(d\epsilon_b)_{\sigma_a} = -K_2 \mu [1/E] \sigma_a \, dz \quad (5)$$

$$\sigma_b: (d\epsilon_b)_{\sigma_b} = K_1 [1/E] \sigma_b \, dz \quad (6)$$

$$(d\epsilon_a)_{\sigma_b} = -K_2 \mu [1/E] \sigma_b \, dz \quad (7)$$

$$\sigma_c: (d\epsilon_c)_{\sigma_c} = K_1 [1/E] \sigma_c \, dz \quad (8)$$

$$(d\epsilon_d)_{\sigma_c} = -K_2 \mu [1/E] \sigma_c \, dz \quad (9)$$

$$\sigma_d: (d\epsilon_d)_{\sigma_d} = K_1 [1/E] \sigma_d \, dz \quad (10)$$

$$(d\epsilon_c)_{\sigma_d} = -K_2 \mu [1/E] \sigma_d \, dz \quad (11)$$

Through superimposition, the total elongations in the directions $a$, $b$, $c$ and $d$ are obtained.

$$d\epsilon_a = [1/E] (K_1 \sigma_a \, dz - \mu K_2 \sigma_b \, dz) \quad (12)$$

$$d\epsilon_b = [1/E] (K_1 \sigma_b \, dz - \mu K_2 \sigma_a \, dz) \quad (13)$$

$$d\epsilon_c = [1/E[ (K_1 \sigma_c \, dz - \mu K_2 \sigma_d \, dz \quad (14)$$

$$d\epsilon_d = [1/E] (K_1 \sigma_d \, dz - \mu K_2 \sigma_c \, dz \quad (15)$$

From Equations 12 to 14, the four unknown stresses $\sigma_a$, $\sigma_b$, $\sigma_c$ and $\sigma_d$ are obtained when the stresses are measured in the four directions $a$, $b$, $c$ and $d$. Three of these normal stresses are enough to determined the sought main stresses according to magnitude and direction, in the depth $z$. The fourth normal stress, may serve for control purposes.

For testing and economical reasons, measurements should be effected in three directions since the lower limit of the number of measuring directions, as shown by the theory of elasticity, two-directional measurements, are not adequate for determining the three unknowns $\sigma_1 = \sigma_{max}$, $\sigma_2 = \sigma_{min}$ and the main direction.

To solve the problem, another two generally applicable equations may be derived from the theory of elasticity and added to Equations 12 to 15. The equations are $$\sigma_a + \sigma_b = \sigma_c + \sigma_d = \sigma_1 + \sigma_2 \quad (16)$$

$$d\epsilon_a + d\epsilon_b = d\epsilon_c + d\epsilon_d = d\epsilon_1 + d\epsilon_2 \quad (17)$$

This means that the sum of the normal stresses or the sum of the normal expansions is an invariant of the stress or elongation condition.

After various conversions, this results in the following equations for the stresses: $\sigma_a(z)$, $\sigma_b(z)$ $\sigma_c(z)$, whereby the angle between $\sigma_a$ and $\sigma_b$ is 90° and the angle between $\sigma_a$ and $\sigma_c = \phi \cdot \phi$ is as desired, however, not equal to 0 and not equal to 90°.

$$\sigma_a(z) = [E/K_1^2 - \mu^2 k_2^2][k_1 (d\epsilon_a)/(dz) + \mu K_2 (d\epsilon_b)/(dz)] \quad (18)$$

$$\sigma_b(z) = [E/K_1^2 - \mu^2 K_2^2][K_1 (d\epsilon_b/dz) + \mu K_2 (d\epsilon_a/dz)] \quad (19)$$

$$\sigma_c(z) = [E/K_1^2 - \mu^2 K_2^2][K_1 (d\epsilon_c/dz) + \mu K_2 ([d\epsilon_a/dz ] + [d\epsilon_b/dz ] - [d\epsilon_c/dz ])] \quad (20)$$

For the main stresses and the main directions in the plane z, it therefore, follows for $\phi = 45°$ from Equations 18 to 20 and Mohrs stress circuit that $$\sigma_{1,2} = \sigma_{max,min} = [\sigma_a(z) + \sigma_b(z)/2 ] \pm [1/\sqrt{2}] \sqrt{[\sigma_a(z) - \sigma_c(z)]^2 + [\sigma_c(z) - \sigma_b(z)]^2} \quad (21)$$

$$\tan 2\alpha = [2\sigma_c(z) - [\sigma_a(z) + \sigma_b(z)]/\sigma_a(z) - \sigma_b(z) ] \quad (22)$$

wherein $\alpha$ is the angle between the measuring direction $a$ and the first main direction I-I of the main tension $\sigma_1 = \sigma_{max}$, measured counterclockwise, according to FIG. 2d.

DETERMINATION OF THE DECAY FUNCTIONS FOR THE BIAXIAL INTRINSIC STRESS CONDITION

The determination of the decay functions $k_1$ and $K_2$ is effected analogously to the uniaxial calibrating test, according to FIGS. 1, 1a and 1b, with the same measuring spot geometry, the same recess bore, hole, or the like, cross-section, the same strain gages being used and the same arrangement of strain gages as in the original test, according to FIGS. 2a and 2b. In view of the fact that the original material which is of primary interest is an alloyed steel, the same steel with the same transverse contraction number was used as a calibrating material in the biaxial calibrating test, since, as hereinbefore mentioned, $K_2$ depends upon $\mu^*$ and in order to eliminate all kinds of error sources with respect to testing technique such as, for example, variable heat transfer or heat dissipation conditions during milling. The calibrating steel may be of the same or similar composition as the original work material, and may particularly have the same thermal conductivity and transverse contraction number.

A biaxial stress condition is simulated on the calibrating material specimen (FIG. 2f) whereby the direction of the stress $\sigma_{a=}$ of the measuring direction a coincides with the direction of the outwardly applied main stress $\sigma_{1=}$. The outwardly applied loading which is in direction of the main stress $\sigma_{1=}$ is indicated in FIG. 2f, as P*. The outer stress or load effects a uniformly rated elongation $\epsilon_n$ across the cross-section of a calibrating material specimen 8 (FIG. 2f and horizontal line $\epsilon_n$ in FIG. 2g). Based on the fact that the measuring spot geometry in FIG. 2f corresponds to that of FIGS. 2a and 2b, the designations of the annular slot or groove 7, the annular core 4', the annular core diameter D and the annular groove width t appear in FIG. 2f. The elongation measuring or strain gage strips of the measuring spot 4 are not depicted in greater detail in FIG. 2f. They are arranged and designed the same as in FIG. 2a.

Thus, the elongations $$d\epsilon_{a=} = d\ \epsilon_{1=} \text{ and } d\ \epsilon_{b=} = d\ \epsilon_{2=}$$

are measured with strain gage strips A and B, which also measure the sum elongation $$\epsilon_{a=} = \Sigma d\ \epsilon_{a=} \text{ and } \epsilon_{b=} = \Sigma d\ \epsilon_{b=}$$

The measured longitudinal and transverse elongations $\epsilon_{a=}$ in the pulling or positive direction and $\epsilon_{b=}$ diagonally to the pulling direction, or the negative direction, are plotted in FIG. 2g relative to the cut-in depth z.

The fact that the elongation $\epsilon_{a=}$ according to a specific cut-in depth which is about 4.5 mm in the present example, exceeds the rated elongation $\epsilon_n$, does not produce a falsification of the measuring results, since this factor is included in the decay functions $K_1$ and $K_2$. Therefore, the stress distribution $\sigma_{a=}$, which is depicted in FIG. 2f as being uniform across the cross-section, applies strictly only for the not-yet cut-in condition.

Since in the calibrating test according to FIG. 2f the tensile stress acting in the direction b is $\sigma_{2=} = \sigma_{b=} = 0$, Equations 12 and 13, after an appropriate conversion, provide the following expressions for the decay functions.

$$K_1 = K_1(z) = [E^*/(\sigma_{a=}^2 - \sigma_{b=}^2)]\ [\sigma_{a=}(d\epsilon_{a=})/(dz) - \sigma_{b=}(d\epsilon_{b=})/(dz)] = [(E^*)/(\sigma_{a=}^2)][(d\epsilon_{a=})/(dz)]$$

(23)

$$K_2 = K_2(z) = [E^*/\mu(\sigma_{b=}^2 - \sigma_{a=}^2)][\sigma_{a=}(d\epsilon_{b=})/(dz) - \sigma_{b=}(d\epsilon_{a=})/(dz)] = -[(E^*)/(\mu^*\sigma_{a=})][(d\epsilon_{b=})/(dz)]$$

(24)

In the foregoing equations $\mu^*$ indicates the transverse contraction number of the calibrating material and $\mu$ is the transverse contraction number of the component material.

FIG. 2e shows qualitatively the relations between the various magnitudes obtained from the calibrating test. $\sigma_{a=} = \sigma_{1=}$ is known thereby, $\epsilon_{a=}$ and $\epsilon_{b=}$ are measured and $K_1$ and $K_2$ are calculated according to Equations 23 and 24; the derivatives $d\ \epsilon_{a=}/dz$ and $d\ \epsilon_{b=}/dz$ may be formed, graphically, for example. $K_1$ and $K_2$ are, if $\mu = \mu^*$, analogously to the uniaxial calibrating test, here too only functions of the form of the annular core and the annular slot or groove, that is, functions of the magnitudes D, t and z and the strain gage strips and of the arrangement of the strain gage strips.

FIG. 2h illustrates qualitatively the positive decay functions $K_1$ and the negative decay functions $K_2$ derived from the spatial calibrating test, according to FIGS. 2f and 2g and plotted relative to the cut-in depth z.

SUMMARY OF THE INDIVIDUAL MEASURING STEPS

In summary, the following steps are followed for determining the intrinsic stress distribution according to magnitude and direction, as a function of z, in a spatial component and the measuring spot geometry, according to FIGS. 2a and 2b.

1. Determination of the decay functions $K_1 = f_1(z)$, $K_2 = f_2(z)$ in a calibrating test under analogous testing conditions which prevailed during the original test, meaning the same measuring spot geometry.

2. Measurement of the surface elongation $\epsilon_a$, $\epsilon_b$, $\epsilon_c$ as a function of z. $\epsilon_a$, $\epsilon_b$, and c are the total elongations in the three measuring directions a, b, c which change the elongations constantly as the cut-in depth increases.

3. Formation of $d\epsilon/dz$, that is, the deductions from $\epsilon_a$, $\epsilon_b$, $\epsilon_c$ according to z and the calculations of $\sigma_{1,2}$ and $\alpha$, as a corresponding function of z, and, on the basis of Equations 18 to 22 and of the original material characteristics E and $\mu$. The evaluation may be effected fundamentally graphically and/or by computation, or by computer, using a suitable program.

INSTALLATION OF STRAIN GAGE STRIPS

The following points are essential regarding the selection of the strain gage or elongation measuring strips and the selected arrangement and design of the measuring spot during the original and the calibrating test.

1. The strain gage strip carrier, that is, the combination of the three intersecting strain gage strips, should be of the smallest dimensions and should have a round shape, since the cut-in depth depends upon the core diameter. In other words, the smaller the diameter of the annular core, the better the degree of release at a given annular slot or groove depth.

2. The carrier substance which holds together the strain gage strips is preferably transparent, so that a good control of the position of the strain gage strips is possible during the application. An annular core diameter of 14 mm, which was determined according to the dimensions of the strain gage carrier having a diameter of 12 mm appears to be very favorable.

It appears that a 14 mm core diameter still leaves enough room for a good junction between the adhesive and the original material of the component, being tested.

FIG. 3a shows the construction wherein an adhesive 9 holds the three strain gage strips DMS to the carrier. The selected dimensions also decrease the probability of damage to the strain gage DMS carrier and its connections during the machining of the annular slot or groove 7. A particularly preferred method for applying the strain gage strips to the measuring spot 4, according to FIGS. 3a, 3b and 3c, is to apply, following the plotting or marking of the circular measuring spot 4 on the component surface and following the adhering of the strain gage DMS carrier according to FIG. 3a, first of all a protective layer 10 (FIG. 3b) to said carrier. The protective layer 10 comprises a thermally and electrically insulating adhesive mass of plastic material which substantially does not impair the elongation of the strain gage strips DMS. Terminal wires 11 of the strain gages project through the protective layer 10.

The connecting wires are so aligned that a solder support carrier 12, which is circular in shape and adjusted to the round measuring area 4, may be threaded by means of bores 12a, upon the connecting wires 11 of the strain gage strips. The carrier 12 is then lightly pressed into the protective layer 10 and its solder support points, in the form of thin plates of silver or silver-plated copper 12b are soldered to the connecting wires 11. The carrier 12 consists of a material having good electrical insulating properties such as, for example, epoxide glass fiber.

A solder support carrier of the type of FIG. 3c has been found to be particularly suitable for providing the measuring spot arrangement illustrated in FIGS. 2a and 2b. The carrier of FIG. 3c consists of four metal plates formed of quarter sectors $12b_1$, $12b_2$, $12b_3$ and $12b_4$, which define an insulating slot 13, in the form of coordinate axes. The metal plate $12b_4$ serves as a common solder support point and the other three metal plates serve as solder support points for the connections of the strain gages A, B and C, shown in broken lines. The subordinated solder spots of the strain gage strips are indicated as A1, B1 and C1 and the common connecting points are indicated as ABC1.

An adhesive known under the tradename AK 22 is used as the protective layer 10. The good plastic properties of this adhesive and its good adherence to the DMS carrier and the solder support spot carrier 12 may substantially prevent an impairment of the tension release due to said solder support point carrier. The thus obtained measuring spot arrangement affords, firstly, an impeccable mechanical protection of the DMS connecting wires 12, and secondly helps to obtain optimum solder areas for a simple and reliable soldering of the strain gage leads.

The connections of the three strain gages DMS, or A, B and C are guided through the bores 12a (FIG. 3b) formed through the carrier 12 and are soldered to the small plates 12a. The borings or chips which occur during the cut-in of the annular slot or groove 7 do not come into contact with the terminal wires of the strain gages DMS. A milling tool 14 is shown in FIG. 3b and is utilized for true-to-size machining of the annular groove 7. The original values of the strain gages DMS are measured with approximately 1.5 m long copper leads or lines affixed to the solder support spots 12b, and are loosened following the measurement, so that the next layer may be removed, unhampered, with the aid of the cutting tool 14.

When the soldering and unsoldering is properly done, the measuring result will not be affected adversely, since the temperaure range which stems from soldering, decays completely after a waiting time of about 2 minutes. Since considerable temperature changes cannot be expected during measuring, it is enough to provide a strain gage strip as a bridge supplementing branch for the strain gages DMS also arranged in bridge connection. The strain gage strip is installed in the same manner on a steel block. A simple, static strain gage bridge, available for purchase, is adequate for measuring purposes.

DEVICE FOR MACHINING THE ANNULAR SLOT

A preferred device for true-to-size production of an annular slot around a circular measuring spot is illustrated in FIGS. 4a to 4f. It is particularly well suited for performing the disclosed method. According to FIG. 4a, the device comprises a bearing block 15 which is mountable in the region of the measuring spot on the component 5 being investigated which is indicated by its contour. The component may comprise, for example, the original or unfinished workpiece for a turbogenerator rotor and the device is lockable on said rotor. For the purpose on hand, which is the measuring of a component with a cylindrical, curved surface the bearing block 15 is provided with two supporting legs 16 and 17 (FIGS. 4e and 4f).

The legs 16 and 17 are positioned in rotatable or hinged and secured position around two alignable rotatable axes 16' and 17' of the bearing block base body 15. The axes 16' and 17' are parallel to each other and are approximately parallel to the component axis and may be supported at their ends on the component 5 by means of rotatable and secured support legs 18. The bearing block 15 may be locked in its arrested position, according to FIGS. 4a, 4e and 4f, by means of tension bands 19 and 20 of a tensioning device 21, not shown in detail in FIGS. 4b and 4d. The tension bands 19 and 20 engage the support legs 16 and 17, so that the axis of rotation 22 of a cutting head 23 coincides with the normal line M' of the annular core center M (FIGS. 2a and 2b). The mode of operation of the tensioning device 21 is hereinafter described in greater detail.

The device used for producing the annular slot or groove further comprises a regulating jacket, housing, casing or the like, 24 (FIGS. 4a and 4e) which is positioned on the bearing block 15 or its original body 15a and which has a level or height which may be adjusted with respect ot the measuring spot plane 4 of the annular core 4' and which may be removed in relation to the locked bearing block 15 and reinserted. The device also comprises the aforementioned cutting head 23, which is pivotably positioned at bearing surfaces 24a of the regulating housing 24 around the normal line M', that is, the axis of rotation 22, which proceeds through the center M of the annular core. At the same time, the cutting head is provided with a cutting tool 14 which is arranged eccentrically relative to its axis of rotation 22, so that when the cutting head 23 is rotated the cutting tool 14 describes the path of the annular slot 7 to be machined, around the measuring spot center M.

The fundamental substance of the bearing block 15 is a disc type, thin plate or plate type body 15a having a central bore 15b (FIG. 4f) formed therethrough, said bore being internally threaded. The bore 15b may thus threadedly engage a regulating housing 24 which is provided with an appropriate outside thread 24b. The regulating or control housing 24 may be locked relative to the bearing block 15, by means of a stop screw 25 (FIG. 4c) which is threadedly coupled into the lateral face 15c of the bearing block 15. As shown by broken lines, the stop screw 25 is positioned in a threaded bore 15d of the bearing block 15, whereby a pressure piece 25a bears in length-shifting relation at the end of said threaded bore 15d. The pressure piece 25a is pressed during the threading of the stop screw 25 against the thread 24b of the regulating housing 24.

The regulating jacket housing, casing, or the like, 24 is provided at its outer periphery, with a scale division 26 (FIG. 4c) which has 2 × 30 = 60 graduations, uniformly distributed around said periphery. The stroke of the regulating or control housing 24 is 3mm per revolution, and during a rotation by one graduation spacing s, said regulating housing performs a stroke of 5/100 mm. The scale 26 of the regulating housing 24 is positioned opposite a stationary scale 27 provided with 6 graduations of spacing s' (FIG. 4c). The scale 27 is shown in a special horizontal cross-sectional projection in FIG. 4c. Five graduations just brush over the spacing s of the scale 26.

The scales 26 and 27 thus permit an exact reading to 1/100 mm height difference. The scale 27 is marked on a plate 27a which serves as a scale carrier, whereby said plate which is affixed to a metal plate 27b, is carried by a threaded pin 28 which is vertically threaded into the bearing block 15. It is thus possible with the aid of the regulating housing 24 to adjust exactly the level of the cutting head 23 and of its cutting tool 14, relative to measuring spot 4, and to the annular slot 7. A spindle 30 is mounted in an eccentric bore 23a of the cutting head 23 which shows by its axis 29 the eccentricity e relative the axis of rotation 22 of the cutting head. The spindle 30 is rotatably mounted and is used for fastening the cutting tool 14 with the aid of a needle bearing 30a'. The needle bearing 30a is held by a bearing cap 31' threadedly coupled to the cutting head 23 and by a spring or snap ring 33', fastened in said cutting head.

The head of the spindle 30 has a bore 30a for receiving a tracing or marking needle which may be exchanged and is not shown in the drawing and for receiving the cutting tool 14 which is a three-knife hard metal milling tool. The locking is effected by threading the stop screws into radial bores, of which one radial bore 30b is shown. The other end of the spindle 30 has a conical recess 30c into which a drill socket 31a of the boring machine 31 is insertable and may be coupled to the spindle 30, by means of threaded pins 31b which can be threaded into suitably threaded bores of the parts 30 and 31a. The drill socket 31a is thus rotatable with respect to the head 31c of the boring machine 31, and drives the cutting tool 14. The boring machine 31 is preferably adjustable stepless, so that the best cutting speed may be adjusted for the cutting tool 14.

The head 31c of the boring machine is inserted into the appertaining receiving bore 23c of the cutting head 23 and may be tightened with a tightening screw. Two pressure members which are pushed over the tightening screw contain small, wedgeshaped fitting areas (not shown), whereby one of said pressure members is seated loosely on the head end of the tightening screw while the other, which bears against the thread end, may be moved against the first-named pressure member by rotating the tightening screw, and the fitting areas are pressed against the head 31c of the boring machine. The tightening screw 23d within its bore 23d is shown in FIG. 4e, together with the locked boring machine 31.

A ball handle 32 is affixed to the outer periphery of the cutting head 23. The ball handle 32 is threadedly coupled by means of a threaded extension 32a into an appropriately threaded bore 33. The ball handle 32 provides a slow forward or feeding movement along the path of the annular slot 7 for the cutting tool 14 during the milling process. The ball handle 32, as illustrated, is particularly favorable even though other ball handle forms are basically acceptable. Handles are further provided at the outer periphery of the regulating housing 24 for the purpose of threading said housing in and out and for adjusting the cut-in depth of the cutting tool 14, with the aid of the scales 26 and 27. The handles 32 comprise balls 34a, 34 and 34c in intersecting axes arrangement (FIG. 4e).

FIGS. 4a, 4e and 4f show specifically that the ends of the tension bands 19 and 20 bear at bearing angles 35a and 35b of the support legs 16 and 17 which are provided with appropriate holding screws 36a and 36b, respectively. The tension bands 19 and 20 are further placed around the holding screws 36 and riveted to form a loop. The other ends of both tension bands 19 and 20, are guided between clamping jaws 37 and 38 of the tensioning device 21, whereby said clamping jaws are arranged on support legs 39a and 39b of a transverse member 40 having an adjustable level or height (FIG. 4d).

The member 40 is situated at a shiftable level in the region of both its ends, on regulating screws 41a and 41b, which are led through appropriate threaded bores of said member. The regulating screws may be freely turned on the support legs 39a and 39b, as shown. By shifting the regulating screws 41a and 41b in counter or counterclockwise direction, the member 40 may be lifted relative to the component by tensioning the tension bands 19 and 20, or may be lowered relative to the component by loosening said tension bands. One clamping jaw 38 is designed, to this end, as an eccentrically rotatable roller bearing against the member 40, with its axis of rotation 42 and one of its profiles 43 for affixing the turn handles (FIG. 4b). The other clamping jaw 37 is tightly formed at the member 40 and its profile 37a corresponds to the curve or shape of the tension band.

The jaw or roller 38 is eccentrically positioned in a manner whereby when the member 40 is moved higher, when the tensile stress of the tension bands 19 and 20 increases, said jaw or roller is rotated or turned by the tension band 20 in friction-locking relation, in the sense of reducing the clamping gap 44. That is, the jaw or roller 38 is turned in the direction of an arrow 45. The tensioning device 21 is therefore self-locking, so that there is no likelihood of loosening or slackening in a locked condition. The support legs 16 and 17 may be rotated, following the loosening of the bearing screws 16a and 17a, around their rotating axes 16' and 17', into the position which corresponds to the respective component curve, and are thereafter locked by tightening the bearing screws 16a and 17a. Together with the tensioning device 21 this affords a very stable, and, with regard to the measuring spot center M, an exactly centered position of the device.

The rotating position of the support legs 18a, 18b, 18c and 18d, too, may be fitted with the aid of corresponding bearing screws 18aa, 18ba, 18ca and 18da, exactly to the surface curvature of the component 5, whereby said legs may also be provided with foil 18ab, 18bb, 18cb and 18db, respectively, (FIG. 4f) which increases the static friction. The illustrated support legs 18a, 18b, 18c and 18d may be replaced for the purpose of fastening the bearing block 15 and the entire device on planar component surfaces, with adhesive magnetic legs, since the necessary adhesive forces may be obtained with a heavy large area installation of adhesive magnet legs, without the use of the tension bands 19 and 20, by means of tensioning device 21.

In special cases, where annular grooves or slots are worked or cut into components having the configuration of narrow discs sheets or bodies, another modification of the device is possible in a manner whereby instead of the support legs 18a, 18b, 18c and 18d and the tension bands 19 and 20, the bearing block 15 may be braced against the front surfaces of the discs or bodies by pressure screws of the support legs 16 and 17 of said bearing block. To accomplish this, the pressure screws should be of an appropriate length and should be threaded into the support legs 16 and 17 instead of the support leg bearing screws 18aa, 18ba, 18ca and 18da.

It should further be mentioned, that the cutting head 23 is inserted from above into fitted surface 24a of the regulating housing 24. The cutting head 23 is slid into position and braces with one shoulder 23e against the regulating housing 24. A holding ring 46 is tightly threaded to the cutting head 23 at the bottom of said cutting head. Outer ring portions 46a (FIG. 4a) of the ring 46 overlap sliding or gliding surfaces 24c of the regulating housing 24. Thus, after the ring 46 is affixed the cutting head 23 is therefore very accurately rotatably coupled with the regulating housing 24. This is important for the exact adherence to the depth of the groove 7. Affixed to the cutting head 23 is a ball oiler element 47 (FIG. 4a) having a channel 47a, via which oil flows into an annular pocket 48, whereby all gliding surfaces between the gliding head 23 and the housing 24 are lubricated.

The disclosed device solves the problem of an exact positioning of the strain gage strips with regard to the annular slot or groove, in a perfect manner, by first marking the measuring spot 4 while the device is fixed or clamped, with the aid of the marking needle affixed in the bore 30a. Thereupon, the regulating housing 24 and its cutting head 23 are unthreaded from the bearing block 15 and the strain gage strips may then be installed in the region of the measuring spot 4, while the bearing block is clamped. The first measurment may then be carried out with the aid of the strain gage strips, while the measuring conditions, leads or lines are connected. Subsequently, the alternating milling-in or deeper milling of the annular slot 7 is effected by the unit 23, 24, 30, 31 while the cutting tool 14 is clamped.

The subsequent measurements are effected with the unit 23, 24, 30, 31 removed and with soldered-on terminal leads for the strain gage strips. Thus, starting with the marking of the measuring spot 4 until the termination of the measuring operation, the device remains in unchanged, clamped condition. Hence, an exact center position of the strain gage strips on the annular core 4' depends only on reliable adhesion, but not on the alignment of the device, which provides a very good measuring accuracy. The work cycle of a measuring process, in detail, is as follows (FIGS. 3a to 3c and 4a to 4f).

1. The measuring spot 4 is cleansed of scale, rust and dirt, the surface is polished clean and is subsequently roughened with sand paper, effecting a circular movement.
2. The bearing block 15 is tightly clamped.
3. The unit 23, 24, 30, 31 of the device is threaded into the bearing block 15 and includes the clamped-in drawing stylus or needle.
4. A circle is marked by the drawing stylus clamped in the spindle 30.
5. The unit 23, 24, 30, 31, whose parts remain tightly interconnected, is removed.
6. The center point M of the measuring spot 4 is marked by a stencil.
7. Any ridge which may occur during marking is removed by light grinding or lapping.
8. The measuring spot 4 is impeccably cleaned with a fat-free lubricant such as, for example, aceton.
9. The strain gage strips are exactly aligned with the aid of a transparent adhesive band and are subsequently cemented or affixed to the measuring spot 4.
10. The strain gage strips (FIGS. 3a to 3c) are installed.
11. The original elongation value is measured. The strain gage leads are unsoldered.
12. The unit 23, 24, 30, 31 is threaded into the bearing block 15, whereby a three-knife hard metal milling device (FIG. 4a) is inserted in the spindle 30.
13. The zero value of the depth measurement is determined by the cut-in of the milling device 14.
14. The annular slot or groove 7 is milled to a desired depth.
15. The unit 23, 24, 30, 31 of the device is unthreaded or uncoupled. The additional work cycle proceeds up to the final slot or groove depth, per the foregoing steps 11 to 15.

The milling out of the respective layer depth dz and the subsequent measuring of the elongations $\epsilon_a$, $\epsilon_b$, $\epsilon_c$ is preferably effected, for example, in steps of 0.5 mm. In an $\epsilon$, $z$ diagram, the $\epsilon_a$, $\epsilon_b$, $\epsilon_c$ curves are drawn from $z=0$ or $\epsilon = 0$ up to the maximum milling depth. The additional evaluation of the measurement of the original test, together with the values determined from the calibrating test, is effected in the same manner as hereinbefore described.

While the invention has been described by means of specific examples and in specific embodiments, we do not wish to be limited thereto, for obvious modifications will occur to those skilled in the art without departing from the spirit and scope of the invention.

We claim:
1. A method of measuring inherent stresses in structural components of machines and apparatuses such as rotors, discs, beams, containers and housings, the method comprisng the steps of
   a. attaching strain gage means to a surface area of a structural component having a Young's modulus E;
   b. cutting an annular groove around the surface area in a sequence of steps, each time removing a layer of material, the material of the resulting core surrounded by the annular groove expanding analogeously to inherent stresses prevailing in the surface area of the core prior to cutting the groove;
   c. measuring after each incremental cut the depths $d_z$ of the layer of removed material and determining the corresponding groove depth $z = \Sigma dz$; and also
   d. measuring each time by means of the strain gage means the resulting surface strains

$$d\epsilon_{zi}\epsilon_z = \sum_{z=0}^{z} d\epsilon_z$$

of the core, thereby determining a first differential function $(d\epsilon_2)/(dz)$;
   e. separately running a calibrating test with a specimen of calibrating material having a second Youngs' modulus E*, using a measuring spot geometry including groove configuration, strain gage means and arrangement thereof corresponding to the spot geometry of the structural component, the calibrating test comprising applying a known stress $\sigma^*z$ to the specimen by exerting given external forces $P^*$ thereon, thereby simulating an inherent stress corresponding to that at any later $dz$ of the depth coordinate $z$ of the specimen, cutting a groove by layerwise removal of material and each time measuring the surface strains ($d\epsilon^*$, $\epsilon^*_z = \Sigma dz$) of the remaining surface area of the core and the respectively corresponding cutting depths ($dz$, $z = \Sigma dz$), thereby determining a second differential function $(d\epsilon^*_z)/(dz)$, and determining from the known stress $\sigma^*z$ and the second differential function $(d\epsilon^*_z)/(dz)$, the decay function $$K_z = f(E^*, (1)/(\sigma^*_z), (d\epsilon^*_z)/(dz))$$

and f. determining from the thus obtained quantities $K_z$ and $(d\epsilon_z)/(dz)$, the inherent stress $\sigma_z(z)$ of the body released at any locality along the depth coordinate $z$ of the body, which prevails at the surface area of the core, in accordance with the equation $$\sigma_z(z) = f(E, (1)/(K_z), (d\epsilon_z)/(dz)).$$

2. A method as claimed in claim 1, wherein the groove cutting increments are of circular shape on the component and on the specimens so that the core surface areas of the component and the specimen are circular.

3. A method as claimed in claim 2, further comprising the step of attaching electrical wire strain gages, each comprising an elongated rectangular strip, in an arrangement in which the longitudinal and symmetry axes of the strips pass through the center point of the area.

4. A method as claimed in claim 3, further comprising the steps of attaching the wire strain gages, in the configuration of elongated strips mounted on a gage carrier by cementing the gage carrier face-to-face upon the area of the component member, then covering the gage carrier and the gages attached thereto by a protective layer consisting of a thermally and electrically insulating plastic adhesive mass with the connecting wires of the gages protruding through the mass, placing a perforated solder-spot carrier about the area, and threading the wires through the perforations, pressing the solder-spot carrier into the surface of the protective layer, and soldering the connecting wires to the solder spots of the solder-spot carrier.

5. A method as claimed in claim 3, further comprising the step of arranging three strain gage strips on the area in star configuration with the strips longitudinally intersecting each other at the center point and extending in three measuring directions (a, b, c), the triple arrangement being mirror symmetrical relative to two symmetry axes passing through the center point.

6. A method as claimed in claim 3, further comprising the step of arranging three strain gage strips on the area in star configuration with the strips longitudinally intersecting each other at the center point and extending in three measuring directions (a, b, c), the triple arrangement being mirror symmetrical relative to two symmetry axes passing through the center point, covering the attached strain gage strips with a protective layer of a thermally and electrically insulating plastic adhesive mass with the connecting wires of the gages protruding through the mass, placing a perforated solder-spot carrier about the area, and threading the wires through the perforations, pressing the solder spot carrier into the surface of the protective layer, and soldering the connecting wires to the solder spots of the carrier, the solder-spot carrier having four metal plates of which each corresponds approximately to one-quarter section of a circle, placing the four section plates in a circular arrangement about the strain gage area and leaving between them an insulating space corresponding to a cross of coordinate axes, connecting one of the plates to one wire of each of the gages, and connecting the three other plates to the wires corresponding to the three respective measuring directions (a, b and c).

7. A method as claimed in claim 2, further comprising the step of giving the component core surface axis a diameter of about 14 mm, the gage arrangement a diameter of about 12 mm, and the groove a radial width of about 4 mm.

8. A method as claimed in claim 2, for measuring inherent stresses in a structural component having a substantially biaxial inherent stress condition, said condition comprising a plural axial inherent stress condition in which a third main stress near free surfaces is approximately perpendicular to the surface while a substantially biaxial condition, substantially unaffected by the third inherent main stress, prevails in planes parallel to the surface in any direction of the first and second inherent main stress, said method further comprising the steps of effecting, after each incremental cutting, the strain measuring operation in those different measuring directions (a, b, c) of which two direction (a, b) are perpendicular to each other, measuring the corresponding three surface strains (one of $d\epsilon_a$, $d\epsilon_b$ and $d\epsilon_c$ and $\epsilon_a$, $\epsilon_b$ and $\epsilon_c$) of the resulting component core surface area, thereby determining the first differential functions $(d\epsilon_a)/(dz)$, $(d\epsilon_b)/(dz)$ and $(d\epsilon_c)/(dz)$ separately testing the calibrating specimen in the same three measuring directions (a, b, c) and in a simulated two axial condition of inherent stress, in which the direction of the specimen inherent stress $(\sigma^*_a)$ coincides with the direction of an externally applied main stress $(\sigma^*_1)$, measuring each time of the specimen the surface strains ($d\epsilon^*_a$, $\Sigma d\epsilon^*_a$) in the first measuring direction a. of the specimen core surface area, the surface strains ($\epsilon_{b=}$, $\Sigma\epsilon_{b=}$) in the second measuring direction b. of the specimen core surface area and measuring the corresponding cutting depth (one of $dz$ and $\epsilon dz$), thereby determining the second differential functions $(d\epsilon^*_a)/(dz)$, $(d\epsilon^*_b)/(dz)$ and determining from the thus measured specimen data the decay functions $$K_1 = f_1(z) = [(E^*)/(\sigma^{*2}_a - \sigma^{*2}_b)][\sigma^*_a(d\epsilon^*_a)/(dz) - \sigma^*_b(d\epsilon^*_b)/(dz)]$$

$$K_2 = f_2(z) = [E^*/\mu^*(\sigma^{*2}_b - \sigma^{=2}_a)] - [\sigma^*_a[(d\epsilon^*_b)/(dz)] - \sigma^*_b[(d\epsilon^*_a)/(dz)]]$$

wherein $\sigma^*_a$, $\sigma^*_b$ are the inherent stresses of the calibrating specimen simulated by external forces and obtaining at the corresponding depth $dz$ of the removed layer of material, $\mu^*$ is the Poisson's ratio number of the calibrating material, and deriving from the thus resulting quantities of $K_1$, $K_2$, $(d\epsilon_a)/(dz)$, $(d\epsilon_b)/(dz)$, $(d\epsilon_c)/(dz)$ the inherent stresses $\sigma_a(z) = [E/K_1{}^2 - \mu^2 K_2{}^2](K_1[d\epsilon_a)/(dz)] + \mu K_2 [d\epsilon_b/dz$
$]\sigma_b(z) = [E/K_1{}^2 - \mu^2 K_2{}^2](K_1[d\epsilon_b/dz] + \mu K_2[d\epsilon_a/dz]\sigma_c (z)$
$=$
$[E/K_1{}^2 - \mu^2 K_2{}^2][K_1[d\epsilon_c/dz] + \mu K_2([d\epsilon_a/dz] + [d\epsilon_b/dz] - [d\epsilon_c/dz])]$ wherein $\sigma_a$, $\sigma_b$, $\sigma_c$ are the median inherent stresses released in the three directions ($a$, $b$, $c$) at the groove depth $z$ of the body in the layer of material having the depth $dz$, $\mu$ is the Poisson's ratio of the body material.

9. A method as claimed in claim 8, wherein the second main stress ($\sigma^*_b = \sigma_2$) is zero for the calibrating test, whereby the following decay functions are obtained $$K_1 = f_1(z) = [E^*/\sigma^*_a \sigma [d \epsilon^*_a/dz]$$

and $$K_2 = f_2 (z) = [-E^*/\mu^* \sigma^*_a][d\epsilon\epsilon^*_b/dz]$$

10. A method as claimed in claim 8, comprising the step of placing the third measuring direction (c) between the first and second directions (a and b) at an angle of 45° to the first direction, so that the main inherent stress of the component corresponds to $\sigma_{1,2} = \sigma_{max,min} = [\sigma_a(z) + \sigma_b(z)/2] \pm 1/2 \sqrt{[\sigma_a(z) - \sigma_c(z)]^2 + [\sigma_c(z) - \sigma(z)]^2}$ and the angle $\alpha$ in counterclockwise direction between the first measuring direction and the main stress axis is determined in accordance with the equation $\tan 2\alpha = [2\sigma_c(z) - [\sigma_a(z) + \sigma_b(z)]/[\sigma_a(z) - \sigma_b(z)]]$ 11. A method as claimed in claim 1, wherein the specimen material for said calibrating test consists of synthetic plastic having a modulus of elasticity in the order of $E^* \approx 3.0 \times 10^4$ kp/cm$^2$ and a Poisson's ratio $\mu^* \approx 0.33$.

12. Method according to claim 1, wherein a substantially uniaxial inherent stress condition prevails in a component, the width $y'$ of which is very small relative to its length $x'$ and its depth $z$, the inherent stress $\sigma_z(z)$ being present only substantially perpendicularly to the $z$-coordinate the method comprising determining the decay function $K_z = ]E^*/\sigma^*_z] \cdot [d\epsilon^*_z/dz]$ and determining the inherent stress $$\sigma_z(z) = [E/K_z] \cdot [d\epsilon_z/dz].$$

* * * * *